United States Patent
Ramachandran et al.

(10) Patent No.: US 9,177,079 B1
(45) Date of Patent: Nov. 3, 2015

(54) APPARATUS AND METHOD FOR PROCESSING MULTI-DIMENSIONAL QUERIES IN A SHARED NOTHING SYSTEM THROUGH TREE REDUCTION

(75) Inventors: Satya Ramachandran, Fremont, CA (US); Anupam Singh, San Jose, CA (US); Parveen Jain, San Jose, CA (US); Sushil Thomas, San Francisco, CA (US)

(73) Assignee: JOVIANDATA, INC., San Jose, CA (US)

( * ) Notice: Subject to any disclaimer, the term of this patent is extended or adjusted under 35 U.S.C. 154(b) by 619 days.

(21) Appl. No.: 12/692,580

(22) Filed: Jan. 22, 2010

Related U.S. Application Data

(60) Provisional application No. 61/146,605, filed on Jan. 22, 2009.

(51) Int. Cl.
*G06F 7/00* (2006.01)
*G06F 17/30* (2006.01)

(52) U.S. Cl.
CPC .... *G06F 17/30932* (2013.01); *G06F 17/30961* (2013.01)

(58) Field of Classification Search
CPC ............. G06F 17/30961; G06F 17/30327; G06F 17/30864; G06F 17/30595; G06F 17/30982; G06F 17/30932; G06F 17/30507; G06Q 10/06
See application file for complete search history.

(56) References Cited

U.S. PATENT DOCUMENTS

| | | | |
|---|---|---|---|
| 5,758,146 A * | 5/1998 | Schiefer et al. | 707/715 |
| 5,819,255 A * | 10/1998 | Celis et al. | 1/1 |
| 5,918,232 A * | 6/1999 | Pouschine et al. | 1/1 |
| 6,430,565 B1 * | 8/2002 | Berger et al. | 707/600 |
| 6,609,123 B1 * | 8/2003 | Cazemier et al. | 1/1 |
| 6,750,864 B1 * | 6/2004 | Anwar | 345/440 |
| 7,281,013 B2 * | 10/2007 | Chaudhuri et al. | 707/602 |
| 7,337,163 B1 * | 2/2008 | Srinivasan et al. | 1/1 |
| 7,363,287 B2 * | 4/2008 | Kilmer et al. | 1/1 |
| 7,392,248 B2 * | 6/2008 | Bakalash et al. | 1/1 |
| 7,512,600 B2 * | 3/2009 | Al-Omari et al. | 1/1 |
| 7,571,182 B1 * | 8/2009 | Eddy | 1/1 |
| 7,698,264 B2 * | 4/2010 | Leikucs et al. | 707/999.003 |
| 7,747,610 B2 * | 6/2010 | Chinchwadkar et al. | 707/716 |
| 7,779,031 B2 * | 8/2010 | Grosset et al. | 707/770 |
| 7,844,608 B2 * | 11/2010 | Natkovich et al. | 707/737 |
| 7,895,191 B2 | 2/2011 | Colossi | |
| 7,945,569 B2 * | 5/2011 | Drory et al. | 707/743 |
| 7,953,694 B2 | 5/2011 | Colossi | |
| 8,126,870 B2 * | 2/2012 | Chowdhuri et al. | 707/713 |
| 2002/0029207 A1 * | 3/2002 | Bakalash et al. | 707/1 |
| 2004/0117345 A1 * | 6/2004 | Bamford et al. | 707/1 |

(Continued)

OTHER PUBLICATIONS

Goil et al., High Performance OLAP and Data Mining on Parallel Computers, Dec. 1997, Kluwer Academic Publishers, vol. 1, Issue 4, pp. 53-79.*

(Continued)

*Primary Examiner* — James Trujillo
*Assistant Examiner* — Jessica N Le
(74) *Attorney, Agent, or Firm* — Perkins Coie LLP

(57) ABSTRACT

A computer readable storage medium includes executable instructions to receive a request for data from a multi-dimensional cube divided into partitions distributed across nodes supporting a shared nothing distributed multi-dimensional database. The request is transformed into physical access layer operators in a tree structure. The tree structure is reduced into an index scan operator.

19 Claims, 7 Drawing Sheets

(56) References Cited

U.S. PATENT DOCUMENTS

| | | | |
|---|---|---|---|
| 2005/0010565 A1* | 1/2005 | Cushing et al. | 707/3 |
| 2005/0065910 A1* | 3/2005 | Welton et al. | 707/2 |
| 2005/0187977 A1* | 8/2005 | Frost | 707/104.1 |
| 2006/0020933 A1* | 1/2006 | Pasumansky et al. | 717/140 |
| 2006/0218123 A1* | 9/2006 | Chowdhuri et al. | 707/2 |
| 2007/0088689 A1* | 4/2007 | Cras et al. | 707/4 |
| 2008/0147627 A1* | 6/2008 | Natkovich et al. | 707/4 |
| 2008/0189252 A1* | 8/2008 | Branscome et al. | 707/3 |
| 2008/0288524 A1* | 11/2008 | Dumitru et al. | 707/102 |
| 2009/0327254 A1* | 12/2009 | Bruno et al. | 707/4 |

OTHER PUBLICATIONS

Gray et al., "Data Cube: A Relational Aggregation Operator Generalizing Group-By, Cross-Tab, and Sub-Totals", Jan. 1997, Microsoft Research, IBM Research, Data Mining and Knowledge Discovery 1, Kluwer Academic Publishers. pp. 29-53.*

Sismanis et al., "Hierarchical Dwarfs for the Rollup Cube", Nov. 7, 2003, ACM. pp. 17-24.*

Lo et al., "GeMDA: A multidimensional data partitioning technique for multiprocessor database systems," Distributed and Parallel Databases, 2001.

Gray et al., "Data cube: a relational aggregation operator generalizing group-by, cross-tab, and sub-totals," Microsoft Research, IBM Research, Data Mining and Knowledge Discovery 1, 29-53 (1997), 1997 Kluwer Publishers. Mfg in the Netherlands.

Ghandeharizadeh et al., "MAGIC: A Multiattribute Declustering Mechanism for Multiprocessor Database Machines," May 1994, IEEE Transactions on Parallel and Distributed Systems: 5, 5: 509-524.

* cited by examiner

APPARATUS AND METHOD FOR PROCESSING MULTI-DIMENSIONAL QUERIES IN A SHARED NOTHING SYSTEM THROUGH TREE REDUCTION

CROSS-REFERENCE TO RELATED APPLICATIONS

This application claims priority to Provisional Application No. 61/146,605 filed on Jan. 22, 2009, and is related to the following commonly owned and concurrently filed patent applications: "Apparatus and Method for Selective Materialization of Computationally Expensive Multi-Dimensional Tuples in a Shared Nothing System", Ser. No. 12/692,577 filed Jan. 22, 2010 and "Apparatus and Method for Accessing Materialized and Non-Materialized Values in a Shared Nothing System", Ser. No. 12/692,579 filed Jan. 22, 2010, each disclosure is incorporated herein by reference.

FIELD OF THE INVENTION

This invention relates generally to data processing. More particularly, this invention relates to the construction, storage and querying of multi-dimensional data distributed across a plurality of computing units.

BACKGROUND OF THE INVENTION

Distributed computing refers to hardware and software systems containing multiple processing elements and concurrent processes running under loose control. In particular, in distributed computing, a program is split into parts that run simultaneously on multiple computers communicating over a network. Shared nothing architecture distributed computing refers to a computing architecture where each node in the network is independent and self-sufficient. Such a system stands in contrast to a large amount of centrally-stored information, such as in a database or data warehouse.

A query processing task to be performed in a distributed environment is split into operators. An operator is a unit of work to complete a sub-task associated with the task. The unit of work may be an operational code (opcode) or set of opcodes. An opcode is the portion of a machine language instruction that specifies an operation to be performed. The specification and format of an operator are defined by the instruction set architecture of the underlying processor. A collection of operators forms a data processing operation that executes in a pipelined fashion.

An operator works on objects. As used herein, an object refers to operands or data that are processed by an operator. In a distributed computing environment, objects are commonly processed as batches, partitions, keys and rows. A batch is a large collection of data (e.g., 1 billion rows). Partitions define the division of data within a batch. Keys correlate a set of data within a partition. Each key has an associated set of data, typically in one or more rows, also called tuples.

Shared nothing architecture distributed computing holds great promise because of its scalability. However, the sizes of the batches of data handled in such environments creates many challenges with respect to storing and accessing the data. In addition, processing queries for the data is challenging. Accordingly, it would be desirable to provide improved data storage, access and query processing in a shared nothing architecture distributed computing system.

SUMMARY OF THE INVENTION

A computer readable storage medium includes executable instructions to receive a request for data from a multi-dimensional cube divided into partitions distributed across nodes supporting a shared nothing distributed multi-dimensional database. The request is transformed into physical access layer operators in a tree structure. The tree structure is reduced into an index scan operator.

DETAILED DESCRIPTION OF THE INVENTION

Figure 1:
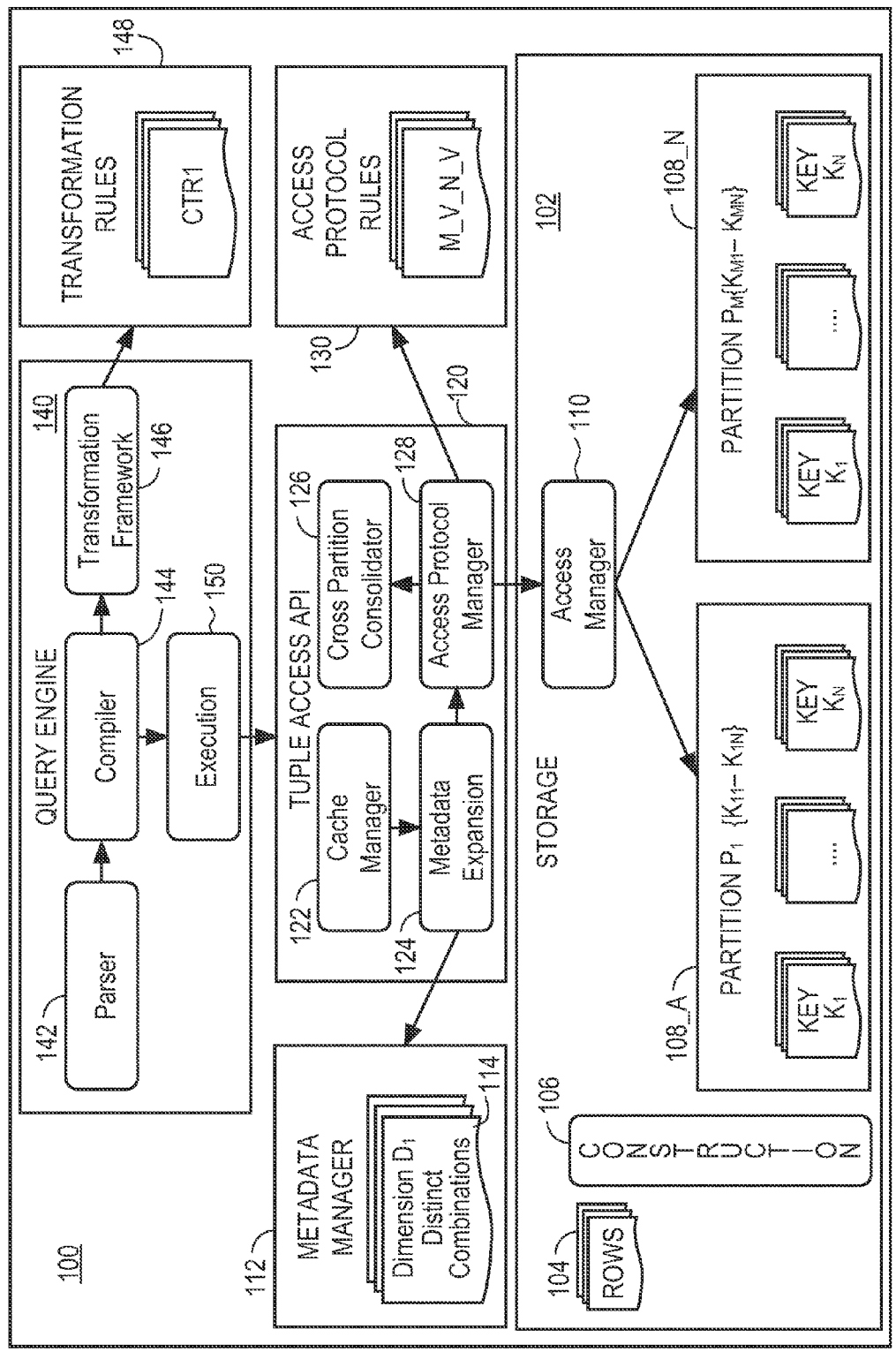
FIG. 1 illustrates a system implementing an embodiment of the invention.

Consider a data schema that has 6 data columns—COUNTRY_NAME, STATE, CITY, YEAR, MONTH, DAY, and one measure—IMPRESSION_COUNT. Example data rows look like this:

US, CALIFORNIA, SAN FRANCISCO, 2009, JAN, 12-43 impressions

US, TEXAS, HOUSTON, 2009, JUN, 3-33 impressions

This data schema may be used to form a multi-dimensional cube. A multi-dimensional cube or Online Analytical Processing (OLAP) cube provides an extension of a two-dimensional array of data. For example, a multi-dimensional cube may allow one to analyze data by product, by time-period, by city, by type of revenue and cost. These additional methods of analyzing data are dimensions. A multi-dimensional cube includes numeric facts called measures. Measures are categorized by dimensions. In the example above, a multi-dimensional cube may be formed based upon country name, state, city, year, month, day and the measure impression count.

Each of the elements of a dimension can be summarized using a hierarchy. The hierarchy is a series of parent-child relationships. Typically, a parent member represents the consolidation of the values of its children.

Also consider a few sample queries that will be run on the system. Queries are asking about aggregations, an 'ALL' setting for a particular level means that the level is being asked to be aggregated. A '.CHILDREN' setting for a particular level means that one is asking for that level to be fully enumerated. For example, to ask for the number of impressions in the US in 2007, the query looks like this:

Query 1: Impression count for the US for 2007
US, ALL, ALL, 2007, ALL, ALL

A query that asks for impression count of cities in CALIFORNIA, in June of 2009, looks like this:
Query 2: Impression count for cities in CALIFORNIA in June 2007
US, CALIFORNIA, .CHILDREN, 2007, JUN, ALL.
De-Normalized Relational Partitioned Store An initial approach would be to store incoming data rows in the format that they enter the system with minimal processing on the load side. This is the approach used by Relational Online Analytical Processing (ROLAP) engines. Storing a billion rows in a single row-oriented store requires an extremely powerful and expensive machine to secure good performance.

Assume that 1 billion rows are divided to store 1000 partitions, with each partition containing 1 million rows. Assume that partitions are stored in a cluster of nodes uniformly and mechanisms exist to co-ordinate queries across these partitions and consolidate the results as necessary.

To get the answer for Query 1, we need to filter out those data rows that have 'US' in the COUNTRY_NAME field and '2007' in the YEAR field, then add up the IMPRESSION_COUNT measure of all filtered rows and return the total as the requested result. This is a single scan of all rows and a single aggregate grouping of qualified rows. The scan happens on all data rows and could be slow. Indexes could be used to reduce the amount of time this takes, but this approach has corresponding complexities on large data sets.

For Query 2, things get a little more complicated. One can still do this with a single scan, filtering out rows that do not match the 'US', 'CALIFORNIA', '2007' or 'JUN' specifications. One can create groups of rows for each distinct value of CITY and maintain totals for the IMPRESSION_COUNT measure for each distinct CITY value. Because this is a partitioned store, one needs to keep track of output rows per partition and consolidate them before returning results back to the query.

Fully Aggregated Partitioned Store

Consider the full aggregation of all data in the system. This means putting input data rows through a load process where one calculates aggregate values for each incoming row and then consolidates the individual aggregated values to end up with a set of rows where there are no duplicate rows and each row represents the answer to a simple aggregation query. All aggregation answers are known to the cube since each level has been aggregated.

Processing the following input line,
US, CALIFORNIA, SAN FRANCISCO, 2009, JAN, 12-43 impressions
results in the following fully aggregated 64 rows.
US, CALIFORNIA, SAN FRANCISCO, 2009, JAN, 12-43 impressions
US, CALIFORNIA, SAN FRANCISCO, 2009, JAN, ALL-43 impressions
US, CALIFORNIA, SAN FRANCISCO, 2009, ALL, 12-43 impressions
US, CALIFORNIA, SAN FRANCISCO, 2009, ALL, ALL-43 impressions
US, CALIFORNIA, SAN FRANCISCO, ALL, JAN, 12-43 impressions
US, CALIFORNIA, SAN FRANCISCO, ALL, JAN, ALL-43 impressions
US, CALIFORNIA, SAN FRANCISCO, ALL, ALL, 12-43 impressions
US, CALIFORNIA, SAN FRANCISCO, ALL, ALL, ALL-43 impressions
US, CALIFORNIA, ALL, 2009, JAN, 12-43 impressions
US, CALIFORNIA, ALL, 2009, JAN, ALL-43 impressions
US, CALIFORNIA, ALL, 2009, ALL, 12-43 impressions
US, CALIFORNIA, ALL, 2009, ALL, ALL-43 impressions
US, CALIFORNIA, ALL, ALL, JAN, 12-43 impressions
US, CALIFORNIA, ALL, ALL, JAN, ALL-43 impressions
US, CALIFORNIA, ALL, ALL, ALL, 12-43 impressions
US, CALIFORNIA, ALL, ALL, ALL, ALL-43 impressions
. . .
ALL, ALL, ALL, ALL, ALL, ALL-43 impressions This approach results in a prohibitive data explosion. In the theoretical worst case, one ends up with close to 64 billion rows being generated for 1 billion input rows. (It is not exactly 64 billion because the ('ALL', 'ALL', 'ALL', 'ALL', 'ALL', 'ALL') row in each aggregation would always get consolidated with other row aggregations.)

Apart from the storage explosion, this also makes the load process computationally expensive. It takes substantial resources and cost to generate such a large number of intermediate data rows and then consolidate identical rows.

A third problem here is that of storing the data in a manner that results in quick retrieval of results. One approach to this problem is to pick a set of levels and to partition the data by those levels. If one picks the COUNTRY_NAME level as the one to partition by, in a data set where some countries have a larger number of rows, this could lead to busy or hot partitions where those countries are stored. Also, the partition with the 'ALL' value for COUNTRY_NAME always ends up with a large amount of stored data. Either the storage for these partitions has to be divided further or one just accepts that the distribution of data in partitions in skewed and leads to slow and busy partitions. Typically, one would try and find levels to partition that are not expected to be as skewed at first glance. Combinations of levels to partition by are also possible. However, in all these cases, data has a way of collecting in places where one doesn't expect it and any deterministic approach to partitioning ends up with some distribution problems because of data skews.

Given all these caveats, it should be clear that this approach is problematic. However, let us also look at the query performance of queries in this system. In the case of Query 1, because all possible aggregations are pre-calculated, including the one being queried, one can respond to the query by doing a simple lookup.

Query 2 poses a different problem. The query is not fully specified because of the .CHILDREN clause. If the .CHILDREN is on a partitioning level, we cannot determine which partitions are to be queried and may have to scan multiple partitions. If the .CHILDREN is not on a partitioning level, we will be able to query a single partition and only scan the data within it for result rows.

Partially Aggregated Orthogonally Partitioned Store with Dimensional Metadata

The current invention takes a different approach to address the foregoing problems. In particular, the invention relies upon the instantiation (i.e., materialization, formation or aggregation) of computationally expensive multi-dimensional tuples to form a multi-dimensional cube. Associated metadata is formed to define hierarchical divisions in the multi-dimensional cube. Thus, a received data store is divided into an aggregated component of instantiated computationally expensive multi-dimensional tuples, a metadata store of unique value combinations per hierarchy, and a non-aggregated component (i.e., the raw data). The following parameters are observed:

If a portion of the multi-dimensional tuple is expensive to compute, it should be pre-materialized. This removes the limitation of running computationally intensive group by operators in classical databases.

When faced with a multi-dimensional tuple for some dimension-levels that are not materialized, the multi-dimensional tuple are generated via shared-nothing computation. This removes the limitation of dynamically re-partitioning terabytes of data based on the nature of the user query.

Hierarchical operators are fulfilled by looking up small amount of metadata. This removes the limitation of running large scale scans to resolve hierarchical operators like Children, Parent, Previous etc.

Once fully resolved, a multi-dimensional tuple is located via a single lookup on a large scale, distributed system. This removes the limitation of running a massive parallel join operator workflow on terabytes of data.

Keep the storage complexity (size and cost) minimal. This removes the scale limitations of most cube materialization techniques.

This is achieved by utilizing a number of techniques:

Expensive Dimension Level Materialization (EDLM): To fulfill the goal of no-group-by computation of expensive dimension-levels, the invention instantiates or materializes all aggregates of expensive dimension-levels. Only materializing certain dimension-levels also helps keep storage complexity low.

Hash Partitioning of Materialized Dimension Levels (HPMDL): To fulfill the goal of using a shared nothing distributed architecture that scales horizontally, the invention utilizes hash partitioning of materialized dimension-level aggregations.

Orthogonal Dimension Level Partitioning (ODLP): To fulfill the goal of shared nothing aggregation of cheap dimension levels, the invention utilizes orthogonal partitioning of dimensional data.

Family Operation Resolution using Metadata (FORM): To achieve the goal of no-scan resolution of family operators, the invention utilizes dimensional metadata.

Previous sections elaborated the problems associated with storing data in traditional ways and demonstrated why systems that handle data in the scale described above are extremely expensive and/or unacceptably slow. The following sections demonstrate how the invention overcomes these shortcomings.

FIG. 1 illustrates a system 100 configured in accordance with an embodiment of the invention. The system 100 includes a storage system 102. An input data store 104 is received. The input data store 104 would typically include at least a billion rows of data. A construction module 106 divides the data store into a set of partitions 108_A through 108_N. Typically, each partition is positioned on a distinct node of a shared nothing architecture. The data is divided to form an aggregated component and a non-aggregated component. The aggregated component includes instantiated computationally expensive multi-dimensional tuples of a multi-dimensional cube. The non-aggregated component includes the original raw data. An access manager 110 provides access to the partitioned data.

Figure 2:
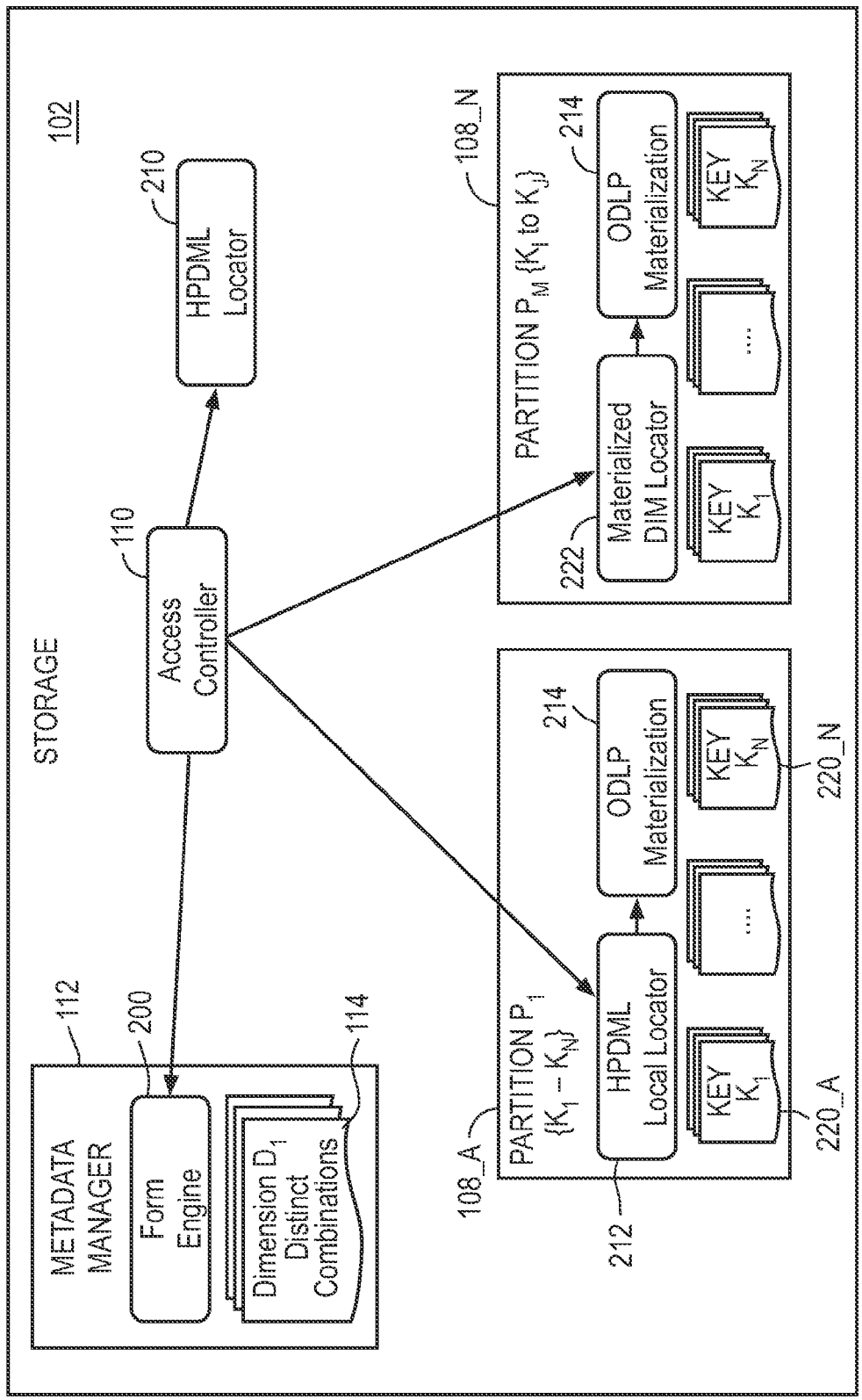
FIG. 2 illustrates a storage system utilized in accordance with an embodiment of the invention.

FIG. 2 is a more detailed characterization of the storage system 102. The access controller 110 accesses a metadata manager 112. The metadata manager stores metadata defining hierarchical divisions in the multi-dimensional cube. The metadata manager 112 may include an executable module 200 to form the metadata. The metadata may then be stored as various dimensions of data 114 that define distinct combinations of fields of the input data store.

The access controller 110 also accesses an HPDML locator 210. As previously indicated, HPMDL references Hash Partitioning of Materialized Dimension Levels. The HPDML locator 210 includes executable instructions to identify a partition where specified data may be found. This may be thought of as a global HPDML locator.

The access controller 110 also coordinates access to individual partitions 108_A through 108_N. Each partition 108 may include an associated HPDML local locator 212. As implied by its name, the HPDML local locator 212 includes executable instructions to resolve locally hashed records. Each partition 108 may also include an ODLP materialization module 214. As previously indicated, ODLP references Orthogonal Dimension Level Partitioning. The ODLP module 214 coordinates the partitioning of hashed values.

FIG. 2 illustrates Expensive Dimension Level Materialization (EDLM) segments 220_A through 220_N. Each segment materializes aggregates of computationally expensive dimension-levels.

A partition (e.g., 108_N) may also be formed with a materialized dimension locator 222. This module includes executable instructions to specify a path to a materialized dimension. The module may operate autonomously or with information passed in by the metadata manager 112. This partition also includes an ODLP materialization module 214.

The modules of FIG. 2 are exemplary. Their functions may be combined or further divided. The modules are typically distributed across many nodes or machines. The precise location of any module is insignificant. It is the functions that are performed by the modules that are significant.

Returning to FIG. 1, the system 100 also includes an access layer 120. In one embodiment, the access layer 120 includes a tuple access Application Program Interface (API), as discussed below. The access layer 112 may include a cache manager 122 that has executable instructions to cache recently fetched partition segments, as discussed below. A metadata expansion module 124 includes executable instructions to expand metadata information retrieved from the metadata manager 112, as discussed below.

The access layer 120 may also include a cross partition consolidator 126 to coordinate data retrieval between partitions. An access protocol manager 128 references access protocol rules 130, as discussed below.

In sum, and as will be further discussed below, the access layer 120 provides an interface to the query engine which allows the specification of data to be retrieved without specifying the physical storage locations of the data. The access layer 120, metadata manager 112 and access protocol rules 130 may be on a single node, but the components are more typically distributed across many nodes of the system.

FIG. 1 also illustrates a query engine or query optimizer 140. The query engine 140 determines the most efficient way to execute a query. The optimizer considers different query plans for a given input query and attempts to select the most efficient query plan possible. For example, the query optimizer 140 may be a cost-based unit that assigns an estimated cost to each query plan and chooses the plan with the smallest cost. Costs are used to estimate the runtime cost of evaluating the query in terms of the number of input/output operations, the CPU requirements and other factors. The query engine represents query plans as a tree of nodes. Each node represents a single operation that is required to execute the query. The nodes are arranged as a tree where intermediate results flow from the bottom of the tree to the top. Each node has zero or more child nodes. The query engine 140 operates by reducing the tree structure into an index scan operator. This reduction operation is discussed in detail below. In one embodiment, the query engine 140 includes a parser 142 to parse the input query to identify the different operators required to execute the query. The parser 142 may also form a tree structure of operators used to implement the query. The compiler 144 enumerates various levels in the data store to retrieve the required data, as discussed below. The transformation framework module 146 accesses transformation rules 148 to reduce the tree structure into an index scan operator, which is part of the execution plan 150, which is passed to the access layer 120. As with the other modules of FIG. 1, the query engine may be on a single node or distributed across a number of nodes. The operations of the modules of FIGS. 1 and 2 are more fully appreciated with reference to the following discussion.

Consider an input data row that contains the following attributes {D1{L1, L2 . . . LN}, D2{L1, L2 . . . LN} . . . DN{L1, L2 . . . LN}}. The invention picks the dimension-levels that have high probability of combining with other dimension-levels. So, if there is a high probability of D1L1, D2L3 . . . DNL1, this combination is deemed to be expensive. The expensive combination is pre-formed, instantiated or materialized.

The invention picks the expensive levels to aggregate and does not aggregate others. Aggregate levels are selected after a schema-level analysis of the data. Aggregate levels that combine large amounts of data with other levels are selected for materialization. For example, relying upon the foregoing example, a schema analysis may lead to the decision to aggregate the DAY and CITY levels, and not aggregate the COUNTRY_NAME, STATE, YEAR and MONTH levels.

Hence this input line:
US, CALIFORNIA, SAN FRANCISCO, 2009, JAN, 12-43 impressions
would lead to 4 output rows
US, CALIFORNIA, SAN FRANCISCO, 2009, JAN, 12-43 impressions
US, CALIFORNIA, SAN FRANCISCO, 2009, JAN, ALL-43 impressions
US, CALIFORNIA, ALL, 2009, JAN, 12-43 impressions
US, CALIFORNIA, ALL, 2009, JAN, ALL-43 impressions This is the materialization that EDLM refers to.

Even though it seems that this approach will lead to explosion of storage requirements, it is found that in large amounts of data the number of combinations for the levels that are picked are limited, or grow at a very low rate. This assumes that the system is able to consolidate duplicate rows. In many cases, for terabytes of data, one finds that the size of the output cube ends up being smaller than the size of the input data in many cases. Thus, larger data sets—characterized by repetition of level combinations—have a higher propensity to be compressed.

This solution requires a load process that creates the aggregate rows and eliminates duplicates across them. As discussed above, this has an impact in increasing the load time system cost. However, it pays off because once the load completes, very few resources are active in the query phase to return results quickly.

The load process keeps track of unique combinations for each level-these combinations are stored as cube metadata in the metadata manager 112. In the example above, one may keep track of combinations in the GEOGRAPHICAL dimension (COUNTRY_NAME, STATE, CITY) and the TIME dimension (YEAR, MONTH, DAY). Because this approach only maintains unique combinations per dimension, the data sets are reasonably small in size and can be stored and queried quickly.

Data is partitioned based on a hash value of the aggregate level values. So, all rows with a CITY value of 'SAN FRANCISCO' and a DAY value of '3' will reside in the same partition. Similarly, all rows with (CITY, DAY) set to ('HOUSTON', ALL) will reside in the same partition. Below it will be seen how this helps the query engine 140.

Even though hash partitioning is based on values of a few levels, because these level values are selected after the EDLM phase, there is a much better distribution on groups of values compared to partitioning based on level values before the materialization phase. This results in a reasonably uniform distribution of data across partitions.

The hash partitioning strategy is referred to as HPMDL. Having each partition contain all the non-materialized dimension-level rows for a particular partitioning key is referred to as ODLP.

Attention now turns to query performance on this system. Consider the following query.
Query 1: Impression count for the US for 2007
US, ALL, ALL, 2007, ALL, ALL
One extracts the (CITY, DAY) values out of this query to get (ALL, ALL).

This combination is hashed to get to a partition that contains all the rows with these level values. Thus, all partitions are eliminated except a single partition of interest. The data in this partition is scanned in a manner similar to the 'Non-aggregated partitioned store' example. Except in this case, there is a very small subset of data and one is guaranteed to find the result within one partition. Now consider an additional query:
Query 2: Impression count for cities in CALIFORNIA in June 2007
US, CALIFORNIA, .CHILDREN, 2007, JUN, ALL
To handle this query, the metadata is accessed to expand all CITY values where the COUNTRY_NAME is 'US' and the STATE is 'CALIFORNIA'. This is what is referred to by the FORM contribution. The metadata provides a list of CITY names. Then, for each (CITY_NAME, ALL) combination, one can hash the combination to get to a single partition per city. Finally, local partition queries are executed on each of the target partitions similar to the case of Query 1 above.

Storage Layer

The storage system 102 of the invention is designed for speed and scale.

Multi-terabyte cubes are expected to be queried with expected response times in minutes or lower. The storage system is also designed to be low cost, using commodity nodes in a large scale shared nothing architecture so as to scale out horizontally. The data is stored in a highly partitioned form. Each partitions is preferably stored on a single node and all partition queries can be resolved by a node that contains it. Queries that require many partitions can run in parallel on multiple nodes—because the architecture is shared-nothing, execution on different nodes happen without any inter-dependencies and scaling out the solution can be done easily by adding more nodes to the system.

Multiple local storage devices are connected to the worker node. Partitions owned by a worker node are distributed amongst it's storage devices.

FIG. 1 illustrates the higher level system diagram. A controller node keeps track of partition ownership and distributes queries for particular partitions to the nodes that contain them. The controller node may form a portion of the query engine 140.

Functionally, a data store of the invention includes dimensions. Dimensions have levels arranged in a pre-defined hierarchical ordering. For example, the 'GEOGRAPHICAL' dimension may consist of 3 levels 'COUNTRY', 'STATE' and 'CITY' in that hierarchical order. The 'TIME' dimension may contain the 'YEAR', 'MONTH', and 'DAY' values, in that order. A special dimension called 'MEASURES' contains levels that are not ordered in any form. An example level value within the 'MEASURES' dimension is 'SALES IN DOLLARS'. Level values within the 'MEASURES' dimension can be aggregated across rows using a known formula. For the 'SALES IN DOLLARS' measure level, this formula is simple addition. Dimensions do not have any ordering or hierarchy with respect to other dimensions.

An individual data element that can be stored in the system as a collection of values, one for each existing level in the previously configured store. Level values can be ALL indicating that they should be aggregated. They can also be set to a supported family operator such as .CHILDREN, .PREVIOUS, .NEXT, etc.

The data that needs to be queried may be stored in two forms-in a partially aggregated cube store (aggregated component) and a partitioned raw data store (non-aggregated component). Differing system requirements may lead to one or both of these storage formats being used. In all cases, the system also contains a metadata store that keeps track of existing level combinations within each dimension.

Partially Materialized Cube Store

When choosing levels that are to be aggregated, the distribution of data in the system is evaluated. Preferably, the evaluation is independent from assumptions about aggregations that will be asked for by queries that will execute on the system. Systems that choose partially aggregated levels based on expected incoming queries are hard to maintain if query patterns change.

Before getting into the actual criteria used to pick levels to aggregate, it is important to understand the factors involved in this decision. The following costs are associated with materializing dimensions:

Load Costs: The actual aggregation of dimensions takes up compute time and resources. This is a one-time cost that occurs at load time. If many levels are to be aggregated, this cost can become very high.

Storage Costs: Adding to the numbers of aggregated levels leads to an increase in the storage and transportation costs of the materialized data. With very large numbers of levels being aggregated, this cost can be substantial. This is an ongoing cost that is considered more important than the computational cost of the aggregation.

Query Cost: Obviously, a higher number of aggregations happening at load time lead to a fewer number of aggregations at query time. Note that the assumption here is that we are able to store materializations in such a way that lookups of individual materializations is easy even if large numbers of rows are stored.

It has been observed that the COUNTRY_NAME, STATE, YEAR, and MONTH levels have very low cardinality and the combined combinations of these level values in the data remains at a low number. In most cube applications, many levels only combine with a set of other levels at a very low rate of change. This permits one to establish a design where a large majority of specified levels can be placed in this category. We treat these levels as non-aggregated levels.

The other levels in the cube are treated as aggregated. CITY and DAY could be examples of levels that are treated as aggregated levels. Even though the actual cardinality of the DAY level is low (31), each DAY value potentially combines with every other dimension level to lead to a large number of possible combinations across levels. This leads to levels of this type being treated as aggregate levels. The number of unique combinations of these aggregation levels also needs to remain at a level that is commensurate with system cost. Having extremely large numbers of combinations of aggregation levels leads to an explosion in storage costs that makes it difficult to offer a solution at anything but very high cost. Any level values that create an explosion in the number of possible combinations are moved out of the cube entirely and queries that refer to these levels are only available as queries to the partitioned raw store. The partitioned raw store may be organized in any number of known manners. Since the performance benefits or the invention are associated with the aggregated store, no further reference to the partitioned raw store is necessary.

Once there is a split between aggregated data and raw data, each form of data is loaded. Apart from creating aggregations, the load process partitions the output rows by a hash of the combined values of all the aggregated levels. To retrieve a data element that is fully specified, one can easily eliminate all partitions except one by hashing on the level values for the aggregate levels. A query on the small amount of data that remains requires very little or no aggregation.

The number of unique hashes one gets from the aggregations determines the number of groupings of rows in the system. The number of unique combinations of non-aggregated levels determines the maximum size of any one grouping.

EDLM Advantage

Consider a data store where there are two defined dimensions—'GEO' and 'TIME'. The 'GEO' dimension contains the levels 'COUNTRY' and 'STATE' and the 'TIME' dimension contains the levels 'YEAR' and 'MONTH'. The designers of this system have selected the 'YEAR' and 'STATE' levels as aggregation levels. 'COUNTRY' and 'MONTH' levels are not set for aggregation. In addition, there is a measure called 'IMPRESSION_COUNT' that is defined for each incoming data element.

For example, if incoming rows are in the form of (YEAR, MONTH, COUNTRY, STATE, IMPRESSION_COUNT) and YEAR and STATE are specified as aggregation levels, then for the following 9 input lines:

'2007', 'JAN', 'US', 'CALIFORNIA', 3
'2007', 'JAN', 'US', 'CALIFORNIA', 1
'2007', 'JAN', 'US', 'CALIFORNIA', 1
'2007', 'JAN', 'US', 'CALIFORNIA', 1
'2007', 'JAN', 'US', 'CALIFORNIA', 1
'2007', 'FEB', 'US', 'TEXAS', 10
'2007', 'FEB', 'US', 'TEXAS', 1
'2007', 'FEB', 'US', 'TEXAS', 1
'2007', 'FEB', 'US', 'TEXAS', 1 one would store the following cube rows:

'2007', 'JAN', 'US', 'CALIFORNIA', 7
'2007', 'FEB', 'US', 'TEXAS', 13
ALL, 'JAN', 'US', 'CALIFORNIA', 7
ALL, 'FEB', 'US', 'TEXAS', 13
ALL, 'JAN', 'US', ALL, 7
ALL, 'FEB', 'US', ALL, 13
'2007', 'JAN', 'US', ALL, 7
'2007', 'FEB', 'US', ALL, 13

Note that we have aggregated dimension-levels that we deem to be expensive and not aggregated other dimension-levels. This is the EDLM contribution.

HPDLM Partitioning

Now look at the unique level value combinations that exist in these output rows. The following combinations are visible '2007', 'CALIFORNIA'
'2007', 'TEXAS'
ALL, 'CALIFORNIA'
ALL, 'TEXAS'
ALL, ALL
'2007', ALL We calculate a hash value for each of these combinations:

Combination 1:
  values ('2007', 'CALIFORNIA')
  hash key 122323432
Combination 2:
  values ('2007', 'TEXAS')
  hash key 34554352

Combination 3:
  values (ALL, 'CALIFORNIA')
  hashkey 45435436
Combination 4:
  values (ALL, 'TEXAS')
  hashkey 122323433
Combination 5:
  values (ALL, ALL)
  hashkey 633545252
Combination 6:
  values ('2007', ALL)
  hashkey 770234320

Note that we are hashing on 'ALL' values also. This is unlike existing database solutions where hashing happens on the level values in input data rows. We hash on the level values in materialized data rows. This helps create a more uniform set of partitions than would otherwise be possible.

The storage of the output rows is then partitioned by these combinations. Here, since there are 6 combinations with 6 hash keys, there is a maximum of 6 partitions that will contain data. We store all the data for a range of hash keys in a single partition; hence, multiple combinations of values may end up in the same partition. In the example above, Combination 1 has a hash key of 122323432 and combination 4 has a hash key of 122323433. Because ranges of hash keys are stored together, there is a high likelihood that combinations 1 and 4 will reside on the same storage partition. Partitions are stored in a distributed manner across a large scale distributed cluster of nodes.

ODLP Contribution

Consider the actual data stored within each partition. Using the rows from the example above, one can look at the rows that get stored within each partition:
Combination 1:
  values ('2007', 'CALIFORNIA')
  hash key 122323432
  rows
    '2007', 'JAN', 'US', 'CALIFORNIA', 7
Combination 2:
  values ('2007', 'TEXAS')
  hash key 34554352
  rows
    '2007', 'FEB', 'US', 'TEXAS', 13
Combination 3:
  values (ALL, 'CALIFORNIA')
  hashkey 45435436
  rows
    ALL, 'JAN', 'US', 'CALIFORNIA', 7
Combination 4:
  values (ALL, 'TEXAS')
  hashkey 122323433
  rows
    ALL, 'FEB', 'US', 'TEXAS', 13
Combination 5:
  values (ALL, ALL)
  hashkey 633545252
  rows
    ALL, 'JAN', 'US', ALL, 7
    ALL, 'FEB', 'US', ALL, 13
Combination 6:
  values ('2007', ALL)
  hashkey 770234320
  rows
    '2007', 'JAN', 'US', ALL, 7
    '2007', 'FEB', 'US', ALL, 13

Note that we have pulled in data rows that contribute to particular aggregations into the individual partitions that contain all the data for an aggregation. What this permits is that given a fully resolved query tuple, one can immediately locate the subset of stored data in the system that will yield the results for the query. Additionally, one is guaranteed that the result for a fully resolved query tuple is on a single partition, regardless of the number of aggregations being asked for in that tuple. This is the ODLP contribution.

Consider the following query
Query 1: Impression count for all of the US in 2007
'2007', ALL, 'US', ALL
The aggregated dimension-levels in the cube are YEAR and STATE. The values for these levels in the input tuple are
'2007', ALL
We can hash this set of values to get
'2007', ALL
  hashkey 770234320
This will lead us to the partition that stores data for combination 6 above, where we will find the following rows
  '2007', 'JAN', 'US', ALL, 7
  '2007', 'FEB', 'US', ALL, 13
We aggregate up the MONTH level in this set of rows to get the result tuple
  '2007', ALL, 'US', ALL, 20

Note that in the process of getting the result, we had to perform an aggregation. However, that aggregation was only performed on a small subset of the data, and all of that data was contained within a single partition. If multiple tuples are being requested, one can trivially run these requests in parallel on the shared nothing infrastructure because individual tuple requests have no inter-dependencies and only require a single partition to run against.

Metadata Store

The metadata manager 112 keeps track of unique level value combinations for each dimension of interest. For example, in the example rows above, the cube may have been specified to consist of two dimensions—a TIME dimension consisting of the levels (YEAR, DAY), and a GEO dimension consisting of the levels (COUNTRY, STATE). In this scenario, two dimensional stores may be maintained, one for each specified dimension.

The example above yields the following values stored in the dimension stores:
Unique values in the GEO dimension
'US', 'CALIFORNIA'
'US', 'TEXAS'
Unique values in the TIME dimension
'2007', 'JAN'
'2007', 'FEB'

Note that the metadata for the dimensional store is data driven—new incoming rows may add to the list of unique values, or may leave them unchanged, depending on the values contained within the rows.

Intermediate Object Representation (Tuple Retrieval API)

An embodiment of the invention includes an access layer 120. The access layer allows a query engine to retrieve stored data objects specified by a question. Tuples can be retrieved from the storage engine by using a query tuple API. The API call, encoded in Java, may be:
public JDMdxTupleCollection getTuples(JDMdxTupleCollection tuples);
public interface JDMdxTupleCollection {
  public Iterable<JDMdxTuple>tupleIterator( );
}

The input to this call is a collection of tuples being queried. Each element in this collection is an object that implements an interface called JDMdxTuple. A simplified version of this interface is shown below.

```
public interface JDMdxTuple {
    public abstract JDMdxCube getCube( );
    public abstract void setLevel(JDMdxLevel level, JDMdx-
LevelValue value);
}
```
Note that tuple objects are associated with cubes (objects implementing JDMdxCubeRO) and permit the association of cube levels (objects implementing JDMdxLevel) with values (objects implementing JDMdxLevelValue).

These objects can be represented in the simplified forms:
```
public interface JDMdxCube {
    public Iterable<JDMdxDimension>dimensionIterator( );
    public JDMdxDimension getDimension(String dimen-
sionName);
    public Iterable<JDMdxLevel>levelIterator( );
}
public interface JDMdxDimension {
    public Iterable<JDMdxLevel>levelIterator( );
}
public interface JDMdxLevel {
    public JDMdxDimension getDimension( );
    public String getName( );
}
public interface JDMdxLevelValue {
    public void set(JDMdxLevel level, JDMdxLevelValueOp-
erator operator, String value);
    public JDMdxLevel getLevel( );
    public JDMdxLevelValueOperator getOperator( );
    public String getValue( );
    public boolean isChildren( );
}
public enum JDMdxLevelValueOperator {
    OPERATOR_NOTEQUAL,
    OPERATOR_EQUAL,
    . . .
}
```

Using these interfaces, the query compiler 144 can create a representation of a level value (JDMdxLevelValue), associate it with a level (JDMdxLevel) within a tuple (JDMdxTuple), which in turn is associated with a cube (JDMdxCube) that understands the relationships between levels and dimensions in the underlying storage.

A collection of these tuples can then be passed into the access layer 120 via a call to getTuples( ), discussed above. The access layer now uses this information to retrieve a result set that matches the data being queried. The process involved in this retrieval is described below.

Access Layer Components

Every access layer query goes through the following paths.

AM1. Check for Cache Hits

First, the cache manager 122 is used to see if the result set for the tuple being requested is currently cached. If it is, we retrieve the data from the cache and return it. Most access layer calls on a typical customer system fall into this category. Retrieval speeds here are measured in a few milliseconds.

AM2. Metadata Expansion (FORM Engine)

For some types of query tuples, we need to go through a metadata expansion phase where the tuple being queried is first disambiguated in a way that helps the storage layer know how to retrieve the data. The metadata expansion module 124 may be used to perform this operation. Specifically, metadata expansion module 124 is used when an aggregated level value has the .CHILDREN operator associated with it (this translates to a JDMdxLevelValue object whose isChildren( ) method returns TRUE). In this scenario, we first use metadata to expand this level to contain all possible values of the level whose 'CHILDREN' is being retrieved. This may lead to a single input tuple with a .CHILDREN specification being expanded to 100s of tuples with specific values in levels instead of the .CHILDREN specification.

If multiple levels in the query tuple contain the .CHILDREN specification, then each of those levels has to be expanded by consulting the metadata manager 112. For level values with .CHILDREN specifications that reside within the same dimension, the metadata storage permits retrieval of only those values that actually exist in the input data, since metadata generation is per dimension. For level values with a .CHILDREN specification that do not reside within the same dimension, these values have to be expanded out individually, and a Cartesian product of the resultant tuple sets is then computed to get the final set of fully specified tuples. Note that because the metadata does not know of existing level value combinations across dimensions, some query tuples in this result set may not actually exist in the incoming data. In these cases, these tuples get discarded at a later point when the storage layer indicates that no record is available for these tuples.

AM3. Check for Cache Hits

Once metadata expansion has completed, some of the resultant query tuples may be retrievable from the cache. In this phase of cache access, we may determine that some of the tuples that need to be queried are in the cache and others are not. The tuples whose result sets are cached are taken out of the set of tuples to be queried and their result sets are tracked for later addition to the result set being returned.

AM4. Partitioned Store Access (HPDML Locator)

The set of query tuples that need resolution is now processed and for each query tuple, we calculate the hash value that is used as an input into the partitioning scheme for the underlying store. Once this is calculated, the tuples are split into sets based on the partition that they can be resolved from. Individual partition queries can then be run to retrieve any data associated with the tuple sets to be retrieved.

A single partition may have multiple nodes hosting it where data is replicated. The execution engine 150 calculates the optimal node to run partition queries on based on the set of resources available to that node, and an understanding of other workflows that are running on that node.

AM5. Disambiguating Aggregation Level Values within a Partition (HPDML Local Locator)

As has been discussed above, multiple aggregation level values may be stored within a particular partition. We expect some of these combinations to be retrieved many times and others to be rarely retrieved. Hence, we find it useful to extract and store in a distributed cache all the existing rows of a particular aggregation combination. In this step, we see if such an extraction exists already—if not, we create it.

AM6. Retrieving Query Tuple Results from within a Disambiguated Store (ODLP Materialization)

Once we have access to a set of rows that all correspond to the combination values that are present in a tuple, we look at the query values for the non-aggregated levels that are being queried. If the query only contains non-aggregate values for these levels, then the store can perform a quick lookup using simple indexing schemes and return them. If the query contains aggregate values for some of these levels, then the store has to perform an aggregation function on the rows that qualify before returning results.

It is also possible that the query tuple specifies a set of values that do not exist in the store. In this case, an empty result is returned.

AM7. Combine Per Partition Result Sets into a Single Result Set

The access layer takes all the result sets that were retrieved via the above processes and combines them into a single result set that can be returned back to the query layer.

AM8. Store Cache Entries

Once retrieval is complete, entries are added to the cache for later queries to utilize.

Access Layer Protocols

This section characterizes rules that may be applied to incoming query tuples as they pass through the system. Different rules come into play in the AM2 and AM6 modules above.

Protocol M_V_N_V. Specific Level Values in Aggregated and Non-Aggregated Levels

Consider the following query tuple
YEAR='2007'
MONTH='JAN'
COUNTRY='US'
STATE='CALIFORNIA'
This tuple has explicitly set values for each level that is to be retrieved.

AM1R1. Check for Cache Hits

We look for a result set for the following tuple:
'2007', 'JAN', 'US', 'CALIFORNIA'

If this result set is available in the cache, we simply return it, bypassing all the rules below. If this result set is not available, we pass the tuple down the stack. We assume for the purpose of this example that the result set has not been previously cached.

AM2R1. Passthrough Rule

This module does not do any processing on level values that are specified. The tuples output from this module are identical to the incoming tuples.
The Resulting Tuple Here Remains Unchanged
'2007', 'JAN', 'US', 'CALIFORNIA'

AM3R1. Skip Cache Checking for Unmodified Tuplesets

Because AM2 has not made any modifications to the tuples being processed, this layer is a pass through. The tuple is passed on to AM4.

AM4R1. Segment Incoming Tuples into Partitions

Aggregated values from the tuple are separated out.
'2007', 'CALIFORNIA'

We calculate the hash id for this set of values. From above, this hash value is 122323432. We now have a list of tuples and the hash values associated with them:
('2007', 'JAN', 'US', 'CALIFORNIA')(122323432)

We use the partition locator module to resolve this hash key range into a partition ID for a set of nodes that can access this partition.
('2007', 'JAN', 'US', 'CALIFORNIA')(122323432)(partition12)(node5, node12)

Using node resource information, we pick a node from the list of possible nodes to run the retrieval on:
('2007', 'JAN', 'US', 'CALIFORNIA') (122323432) (partition12) (node12)

We pass this data onto the next module.

AM5R1. Create or Lookup a Disambiguated Set of Tuples

The data that this module receives includes information about the partition that the tuple resides on and the node on which to run the rest of the retrieval process. This module is responsible for looking up or creating a data set on that node which contains only the rows pertinent to the hash id that the query tuple hashes to.

If such a data set does not currently exist, then it is created by looking at all the tuples in (partition12) and picking out rows that hash to (122323432). Let's call this new dataset set122323432. The output of this module to the next layer is ('2007', 'JAN', 'US', 'CALIFORNIA') (set122323432) (node12)

AM6R1. Lookup Rule

This module uses set122323432 on node12 to lookup the data for the query tuple. The resulting tuple is
'2007', 'JAN', 'US', 'CALIFORNIA', 7
This is sent on to the next module.

AM7R1. Combine Results

Because of the characteristics of the storage subsystem, combining result sets is never more complicated than just appending incoming result sets to a combined result set which is then produced as the output of this module.

In this case, since there is only one result set with one row, the combined result set also contains
'2007', 'JAN', 'US', 'CALIFORNIA', 7

AM8R1. Store Cache Entries

A cache entry is stored for the result set tuple. This entry can be referenced by future queries that need this tuple without going to the cube store.

Protocol M_ALL_N_ALL. ALL Specification in Level Values in Aggregated and Non-Aggregated Levels Consider the following query tuple
YEAR=ALL
MONTH=ALL
COUNTRY=ALL
STATE=ALL
This tuple has the ALL value set for each level that is to be retrieved.

AM1R1. Check for Cache Hits
See above.

AM2R1. Passthrough Rule

This module does not do any processing on level values that are specified. The tuples output from this module are identical to the incoming tuples.
The resulting tuple here remains unchanged
ALL, ALL, ALL, ALL AM3R1. Skip Cache Checking for Unmodified Tuplesets
See above.

AM4R1. Segment Incoming Tuples into Partitions
See above. The output of this process in this example is:
(ALL, ALL, ALL, ALL) (633545252) (partition6) (node2)

AM5R1. Create or Lookup a Disambiguated Set of Tuples
See above. The output of this process in this example is:
(ALL, ALL, ALL, ALL) (set633545252) (node6)

AM6R2. Grouping Rule

The ALL specification in aggregated levels does not need any special processing here since 'ALL' aggregations have already been performed on these levels. However, the ALL specification on non-aggregated levels require a local group to be constructed with all possible values of the levels where ALL is specified and then measures are calculated on that group to get a set of result tuples.

When this module is executing, it has access to a (set633545252) on (node6). This dataset contains all known tuples for the combination (ALL, ALL) in YEAR and STATE. This full list of tuples is
ALL, 'JAN', 'US', ALL, 7
ALL, 'FEB', 'US', ALL, 13

This list is processed to create a group of tuples that match the other specifications in the input tuples. In this example, that group of tuples is the same set of 2 tuples above. This rule then aggregates the group to end up with this tuple result set.
ALL, ALL, ALL, ALL, 20

AM7R1. Combine Results
　See above.
AM8R1. Store Cache Entries
　See above.
Protocol M_C_N_C. .CHILDREN Specification in Level Values in Aggregated and Non-Aggregated Levels
　Consider the following query tuple
YEAR=.CHILDREN
MONTH=.CHILDREN
COUNTRY=.CHILDREN
STATE=.CHILDREN
AM1R1. Check for Cache Hits
　See above.
AM2R2. .CHILDREN Expansion for Aggregated Levels
　The aggregated levels here are 'YEAR' and 'STATE'. Using the metadata above, the TIME dimension would expand to:
2007, .CHILDREN
　The GEO dimension would expand to:
.CHILDREN, 'CALIFORNIA'
.CHILDREN, 'TEXAS'
　The Cartesian product of these tuples would result in the following set of tuples:
2007, .CHILDREN, .CHILDREN, 'CALIFORNIA'
2007, .CHILDREN, .CHILDREN, 'TEXAS'
　The hash values of these tuples is calculated on the aggregation levels, i.e., YEAR and STATE. The 2 tuples above fall into two unique aggregation level combinations:
Combination 1 (2007, 'CALIFORNIA')
2007, .CHILDREN, .CHILDREN, 'CALIFORNIA'
Combination 2 (2007, 'TEXAS')
2007, .CHILDREN, .CHILDREN, 'TEXAS'
　In the absence of any caching, these two combinations are retrievable from a maximum of two partitions. Note that there is a possibility that both hash values exist on the same partition. As the number of unique hash combinations increases, so does this possibility.
AM3R2. Check the Cache for Modified Tuplesets
　Since the metadata layer has modified the tuples that needs to be queried, a new lookup through the cache is made to see if any of the query tuples are already stored. If they are, the result set of those tuples is passed to AM7. Any uncached query tuples go through to the next layer. For the remainder of this example we will assume that no cache hits were found.
AM4R1. Segment Incoming Tuples into Partitions
　In this case, there are two incoming tuples. The hash ids for both tuples is calculated. Then, the partitions and nodes to access the data on are individually identified. The output of this module is:
　　('2007', .CHILDREN, .CHILDREN, 'CALIFORNIA') (122323432) (partition12) (node12)
'2007', .CHILDREN, .CHILDREN, 'TEXAS') (34554352) (partition23) (node9)
AM5R1. Create or Lookup a Disambiguated Set of Tuples
　Note that multiple, possibly parallel, instances of this rule will run, one for each query tuple in question. The partitions are disambiguated. Then, look up or create data sets that only contain the hash ids of interest. The output of this module:
('2007', .CHILDREN, .CHILDREN, 'CALIFORNIA') (set122323432) (node12)
('2007', .CHILDREN, .CHILDREN, 'TEXAS') (set34554352) (node9)
AM6R3. .CHILDREN Expansion Rule
　Note that multiple, possible parallel, instances of this module will run, one for each query tuple. This module never sees .CHILDREN specifications in aggregated levels since these have already been expanded out in the metadata resolution layer. For .CHILDREN specifications in non-aggregated levels, this rule ensures that all possible level values make it in the tuple result set.
　Consider the processing of this tuple for the hash id 122323432
2007, .CHILDREN, .CHILDREN, 'CALIFORNIA'
　When this module is executing, it has access to (set34554352) on (node9). This data set is known to contain all the possible tuples for the combination ('2007', 'CALIFORNIA'). It goes through this tupleset and looks for tuples that match the specified YEAR and STATE values, and the .CHILDREN specification in the MONTH and COUNTRY. The .CHILDREN specification matches all possible values in those levels. The eventual result set returned from this module contains the following tuple:
'2007', 'JAN', 'US', 'CALIFORNIA', 7
AM7R1. Combine Results
　In this example, this module receives the following two result sets
'2007', 'JAN', 'US', 'CALIFORNIA', 7
and
'2007', 'FEB', 'US', 'TEXAS', 13
　The two are combined and returned as the result set:
'2007', 'JAN', 'US', 'CALIFORNIA', 7
'2007', 'FEB', 'US', 'TEXAS', 13
AM8R1. Store Cache Entries
　See above.
Query Engine Components
　Attention now turns to a query compiler 144 for use in the disclosed system. The design goals are to:
　Minimize the execution engine operations.
　Create a minimum number of requests for the access layer.
　　The Query Compiler delegates the heavy computational processing to the access layer. In the next section, access layer strategies to avoid full scans of the data are disclosed.
Tree Transformation Infrastructure
　Below is a basic code fragment for a depth first traversal of the logical compiler tree. the depth first traversal calls a generic method of begin element and end element on each operator. On an end element method call, a logical operator might decide to replace itself or merge with its children. This decision is called a transformation rule. this method of rule application allows for an infinite set of transformation rules which can be interleaved arbitrarily. In the sections below, specific rules are defined.

```
public JDExprDAGNode DepthFirstVisitor(JDExprDAGNode node) {
  JDExprDAGNode newNode=node;
  /*Using Node Type for redirection, Call Start Element here*/
  boolean  continueVisit=this.acceptBeginElement(node.getType( ), node);
  Integer currentChildOffset=0;
  /*Depending on Node Specific function's returned value,
   *continue the depth first traversal
   */
  if (continueVisit==true) {
  for (JDExprDAGNode child:node.getChildren( )) {
    JDExprDAGNode  newChild=this.DepthFirstVisitor (child);
    node.setChild(currentChildOffset++, newChild);
  }
  }
```

```
/*Using Node Type for redirection, Call End Element here*/
    newNode=this.acceptEndElement(node.getType(   ), node);
    return newNode;
}
```

Single Dimension Query

Consider the following query.

QUERY Q1:
SELECT
{
[Measures].[Impression Count]
,[Measures].[Click Count]
,[Measures]. [Conversion Count]
}ON COLUMNS
,{[GEO].[All GEOs].[USA]}ON ROWS
FROM [Attribution]

Query Engine

The compiler 144 creates a structure that describes the various lattices of the cube requested by the query. The compiler translates the query above to a single request to the access layer 120. In its cube lattice description, the compiler specifies every dimension and every level.

In the query above, the compiler sets every level to 'ALL'. The value 'ALL' for a specific dimension-level, $D_I L_J$, indicates that the measures 'Impression Count', 'Click Count' and 'Conversion Count' have to be calculated across all values of the given Dimension-Level. The request created by the compiler is shown below:

| Dimension | Level1 | Level2 | Level3 | Level4 |
|---|---|---|---|---|
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY = USA | REGION = ALL | CITY = ALL | |

Contrast with Current Systems

In a classic ROLAP system, the above request is translated as a query to create an aggregation across the entire fact table. This means scanning the entire fact table and maintaining each aggregation. On multiple terabytes of data, this scan request could take many hours. Even when the fact table is scanned in parallel on a distributed system, the scanning of the table will take minutes.

Tree Transformation

In one embodiment, the compiler generates a logical tree representation of the incoming tree. Each XML element represents a logical operation. The tree representation is shown as an XML document below:

```
<Query>
    <Axis>
    <{ }>
        <Leaf>
            [Measures].[Impression Count]
        </Leaf>
        <Leaf>
            [Measures].[Interaction Count]
        </Leaf>
        <Leaf>
            [Measures].[Click Count]
        </Leaf>
        <Leaf>
            [Measures].[Conversion Count]
        </Leaf>
    </{ }>
    </Axis>
    <Axis>
    <{ }>
        <Leaf>
            [GEO].[All GEOs].[USA]
        </Leaf>
    </{ }>
    </Axis>
    <Slicer>
    <Leaf>
        [PUBLISHER_ID].[All PUBLISHER_IDs].[HP]
    </Leaf>
    </Slicer>
</Query>
```

Figure 3:
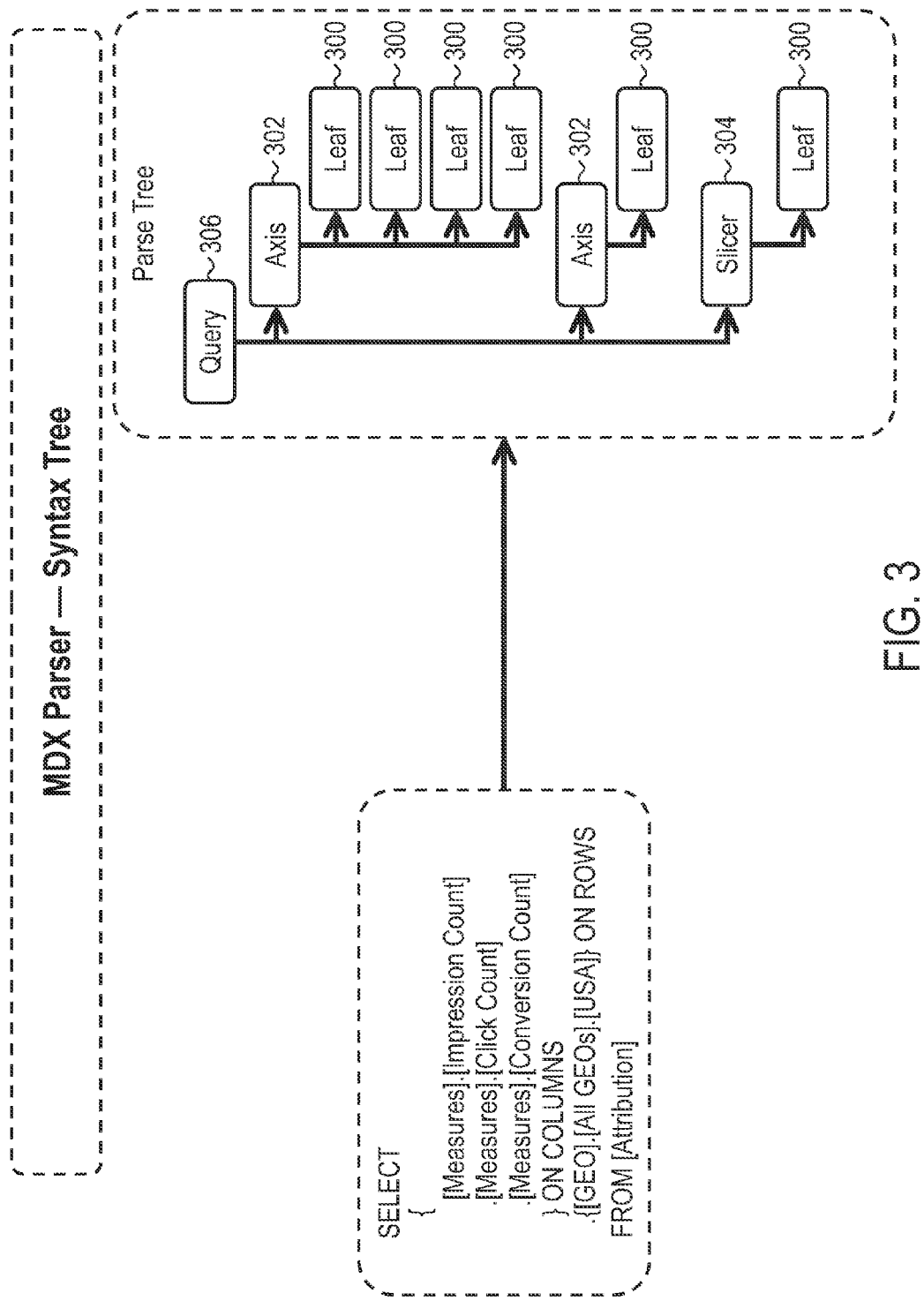
FIG. 3 illustrates a query tree structure processed in accordance with an embodiment of the invention.

A functional implementation of the logical tree above would involve an operation for each node of the tree. FIG. 3 shows 12 operation nodes—6 Leaf Access nodes 300, 2 Axis nodes 302, 1 Slicer Axis node 304, 2 and the Query Node 306.

The compiler consolidates the entire tree into a physical plan. The physical plan consists of 2 nodes—an Index Scan operator followed by a result creation operator. The XML representation of this physical plan is shown below <Xmla result generator>
<Index_Scan                                isEagerScan=false eagerScanPossibleCandidate=false>

| Dimension | Level1 | Level2 | Level3 | Level4 |
|---|---|---|---|---|
| Geo | COUNTRY = USA | REGION = ALL | CITY = ALL | |
| Measures | Impression Count = ? | Click Count = ? | Conv Count = ? | |
| Advertiser | Advertiser_id = HP | | | |
| AdId | AD_ID = ALL | | | |
| AdName | NAME = ALL | | | |
| Time | YEAR = ALL | MONTH = ALL | DAY = ALL | HOUR = ALL |

</Index Scan>
</Xmla result generator>

Tree Transformation Rules

To achieve consolidation of the logical operators into 2 physical operators, the MDX Query Compiler uses the generic depth first visitor framework described above. For each logical operator, a new call back is registered into the depth first framework. Each such callback tries to consolidate the current node with its children node and create a new logical node. For QUERY Q1, the transformation rules which are executed are:

LTR1—Leaf Transformation Rule #1

Generate an empty tuple scan operator. Use the contents of the Leaf to set dimension levels to values from the query. For Query Q1, the Leaf node "[ GEO].[All GEOs].[USA]" will generate a tuple with the Country level of Geo dimension set to the value 'USA'.

| Dimension | Level1 | Level2 | Level3 | Level4 |
|---|---|---|---|---|
| Geo | COUNTRY = USA | REGION = ALL | CITY = ALL | |

Figure 4:
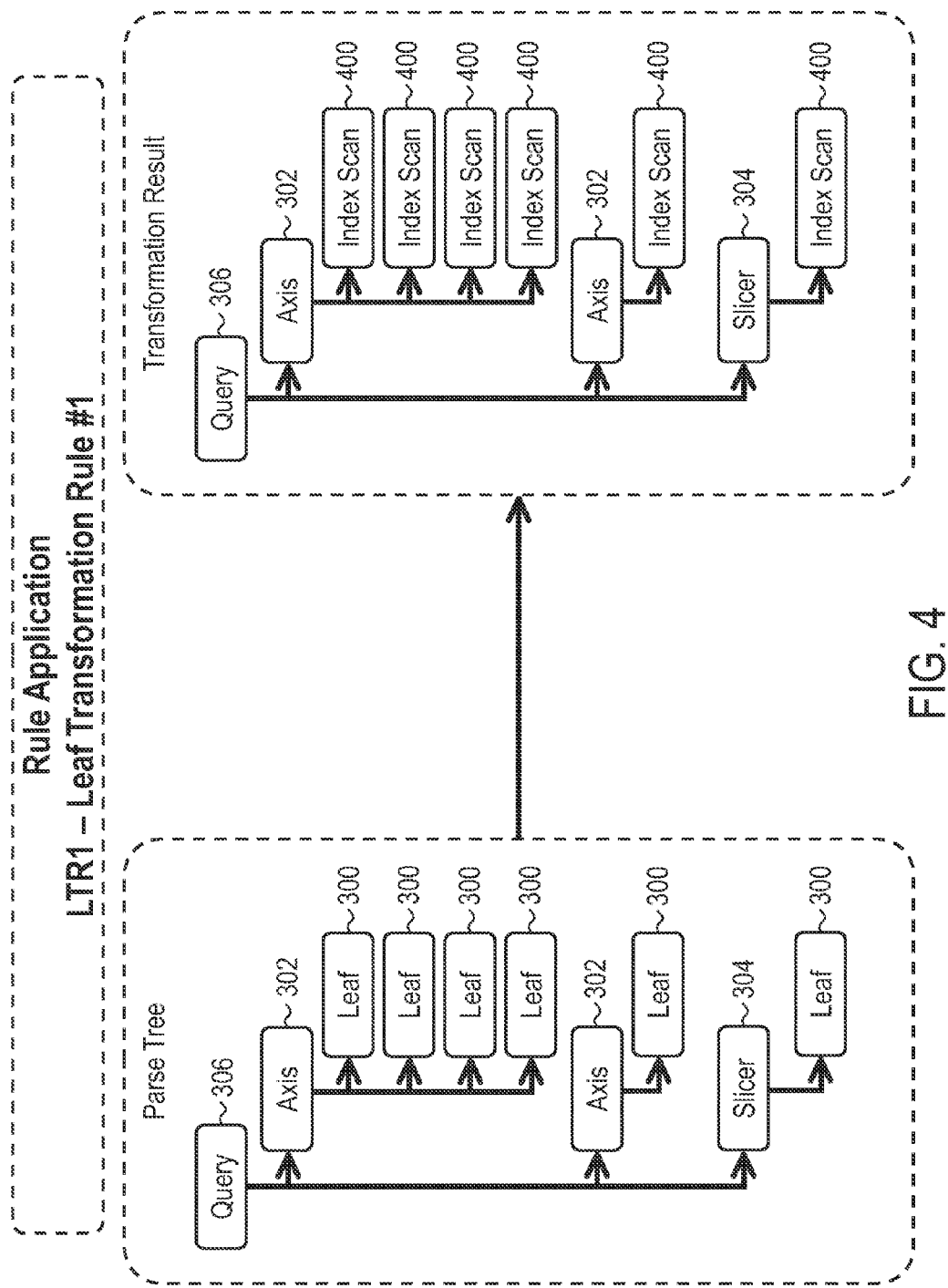
FIG. 4 a Leaf Transformation Rule utilized in accordance with an embodiment of the invention.

The results of this operation are shown in FIG. 4. Observe that the leaf nodes 300 have been substituted with index scan nodes 400.

QTR1—Query Transformation Rule #1

The Query Transformation Rule, QTR1, states that an underlying axis can be merged into a single physical operator unless it is a blocking operator like TOPCOUNT or FILTER. The Query Transformation Rule uses the multiply method of Tuple API to create a single index access physical operator.

For QUERY Q1, the Axis children will be merged by invoking multiply on the tuples generated by Column Axis and the Row Axis elements. The tuple generated by this rule is shown below:

| Dimension | Level1 | Level2 | Level3 | Level4 |
|---|---|---|---|---|
| Geo | COUNTRY = USA | REGION = ALL | CITY = ALL | |
| Measures | Impression Count = ? | Click Count = ? | Conv Count = ? | |

Figure 5:
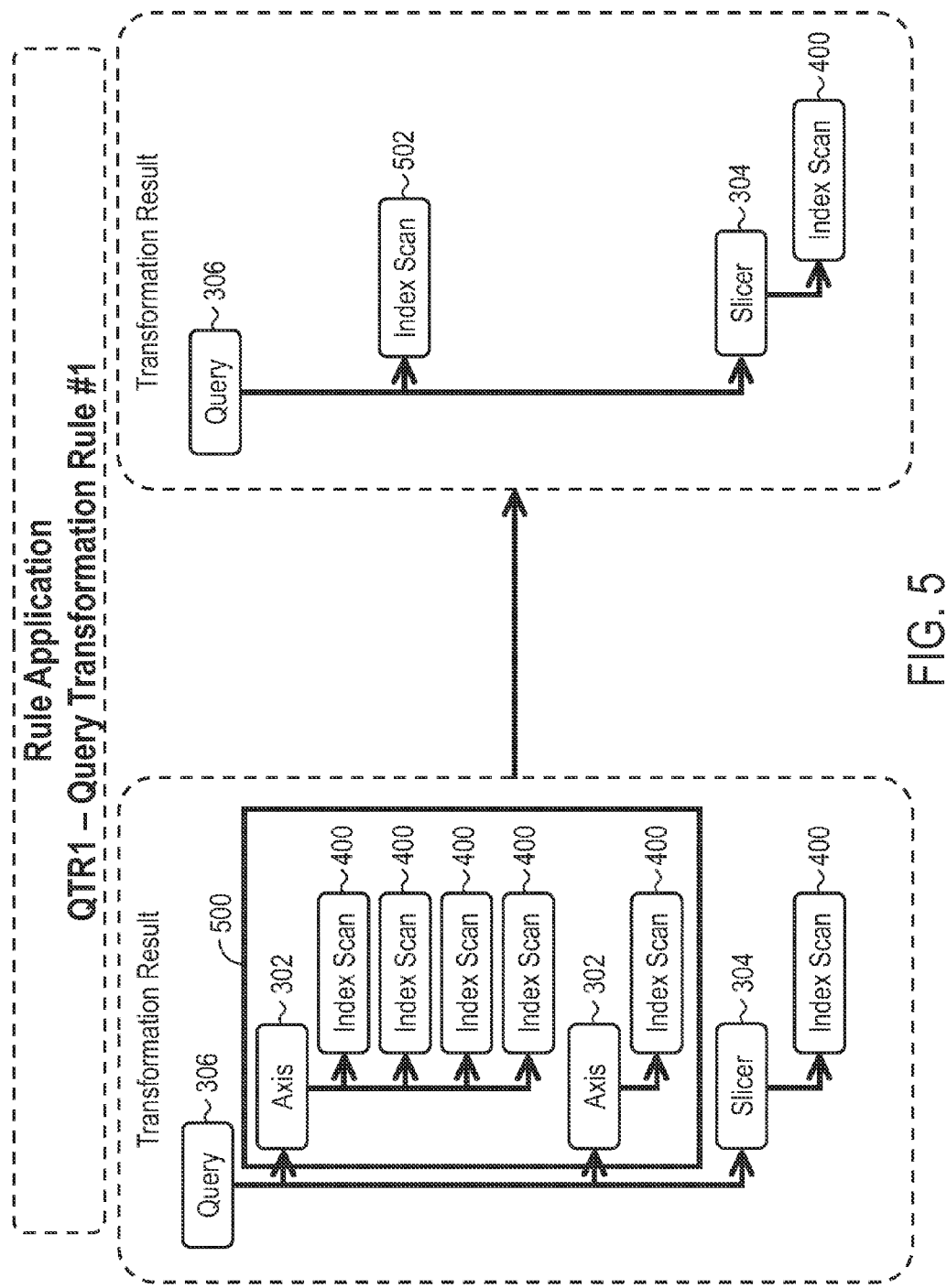
FIG. 5 illustrates a Query Transformation Rule utilized in accordance with an embodiment of the invention.

The results of this operation are shown in FIG. 5. Block 500 is reduced to index scan block 502.

STR1—Slicer Transformation Rule #1

The Slicer Transformation Rule, STR1, states that the Slicer Axis tuple created by the leaf nodes under Slicer nodes are pushed into the tuples created by the other axis.

For QUERY Q1, the tuple generated by rule QTR1 is modified by pushing the tuple generated by the leaf node under the slicer axis. After application of the rule STR1, the tuple generated is shown below:

| Dimension | Level1 | Level2 | Level3 | Level4 |
|---|---|---|---|---|
| Geo | COUNTRY = USA | REGION = ALL | CITY = ALL | |
| Measures | Impression Count = ? | Click Count = ? | Conv Count = ? | |
| Advertiser | Advertiser_id = HP | | | |

Figure 6:
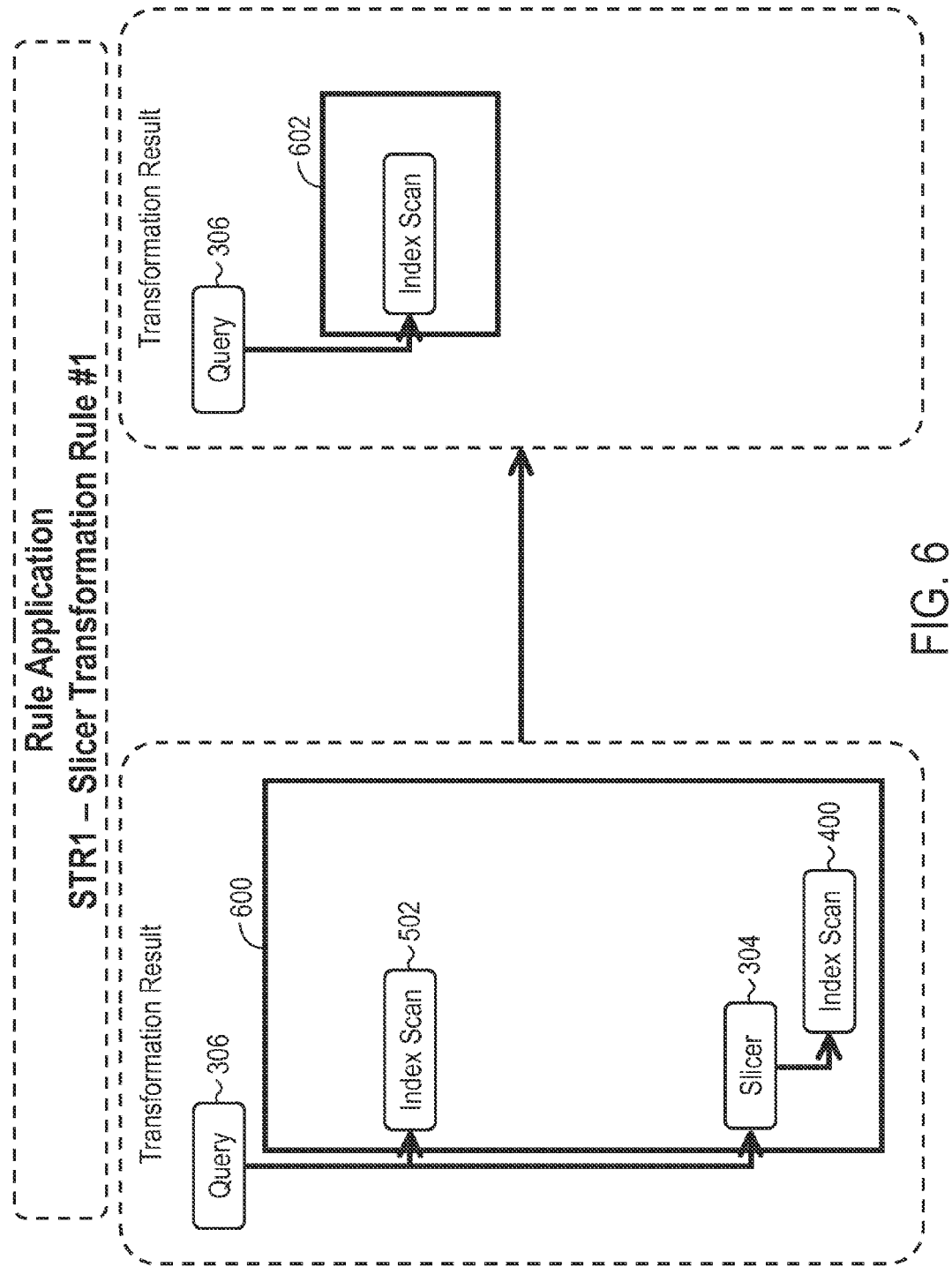
FIG. 6 a Slicer Transformation Rule utilized in accordance with an embodiment of the invention.

The results of this operation are shown in FIG. 6. Block 600 is reduced to block 602.

QTR2—Query Transformation Rule #2

The Query Transformation Rule, QTR2, states that any dimensions defined in the cube but not used in the query are set to 'ALL'. For QUERY Q1, the tuple generated by rule QTR1 is modified to set all other dimension levels (e.g., TIME, AdName) to 'ALL'. After application of QTR2, the tuple generated is shown below:

| Dimension | Level1 | Level2 | Level3 | Level4 |
|---|---|---|---|---|
| Geo | COUNTRY = USA | REGION = ALL | CITY = ALL | |
| Measures | Impression Count = ? | Click Count = ? | Conv Count = ? | |
| Advertiser | Advertiser_id = HP | | | |
| AdId | AD_ID = ALL | | | |
| AdName | NAME = ALL | | | |
| Time | YEAR = ALL | MONTH = ALL | DAY = ALL | HOUR = ALL |

Figure 7:
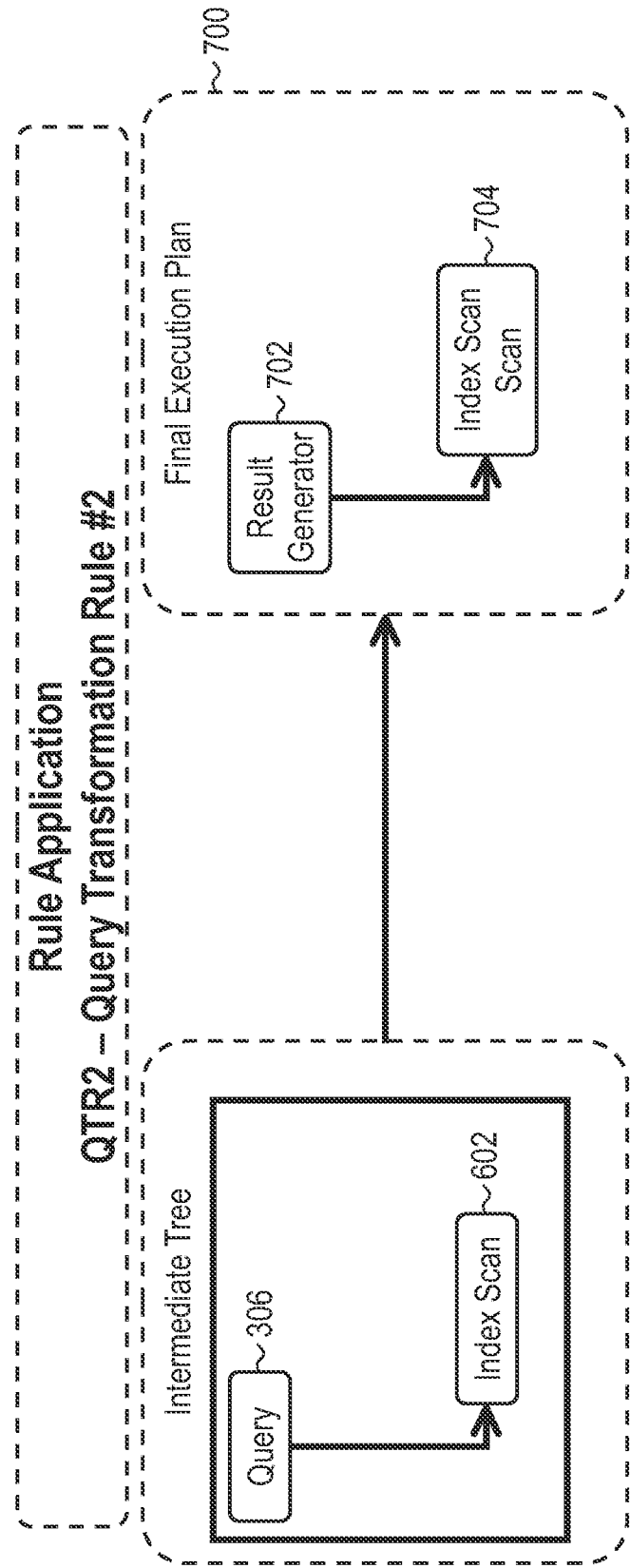
FIG. 7 illustrates a Query Transformation Rule utilized in accordance with an embodiment of the invention.

The results of this operation are shown in FIG. 7, where a final execution plan 700 is formed comprising a result generator 702 and an index scan 704.

Union on a Single Dimension

Consider the following query.

QUERY Q2:
SELECT
{
[Measures].[Impression Count]
,[Measures].[Click Count]
[Measures]. [Conversion Count]
} ON COLUMNS
,
Union
(
  {[GEO].[All GEOs].[UNITED STATES].[CA]}
  ,Union
  (
    {[GEO].[All GEOs].[UNITED STATES].[NY]}
    ,Union
    (
      {[GEO].[All GEOs].[UNITED STATES].[TX]}
      [GEO].[All GEOs].[UNITED STATES].[WA]}
    )
  )
)
ON ROWS
FROM [Attribution]

Query Compiler

Tree Transformation

For the QUERY Q2, the compiler generates a logical tree representation which consists of 3 Union Nodes apart from 1 Query Node, 2 Axis Nodes and 7 Leaf Nodes. The aim of the tree transformation algorithm is to generate a minimal set of Tuple requests to the access layer.

```
<Query>
  <Axis>
    <{ }>
      <Leaf>
        [Measures].[Impression Count]
      </Leaf>
      <Leaf>
        [Measures].[Click Count]
      </Leaf>
      <Leaf>
        [Measures].[Conversion Count]
      </Leaf>
    </{ }>
  </Axis>
```

```
<Axis>
  <Union>
    <{ }>
      <Leaf>
        [GEO].[All GEOs].[UNITED STATES].[CA]
      </Leaf>
    </{ }>
    <Union>
      <{ }>
        <Leaf>
          [GEO].[All GEOs].[UNITED STATES].[NY]
        </Leaf>
      </{ }>
      <Union>
        <{ }>
          <Leaf>
            [GEO].[All GEOs].[UNITED STATES].[TX]
          </Leaf>
        </{ }>
        <{ }>
          <Leaf>
            [GEO].[All GEOs].[UNITED STATES].[WA]
          </Leaf>
        </{ }>
      </Union>
    </Union>
  </Union>
</Axis>
</Query>
```

The minimal set generated by the compiler is two physical operators. Unlike QUERY Q1, the Index Scan operator generates a set of tuples. The set contains four distinct tuples—each for a distinct value for the leaf members in the Union branches.

```
<Xmla result generator>
<Index_Scan isEagerScan=false
   eagerScanPossibleCandidate=false>
```

| Dimension | Level1 | Level2 | Level3 | Level4 |
|---|---|---|---|---|
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY = ALL | REGION = CA | CITY = ALL | |
| Measures | Impression Count = ? | Click Count = ? | Conv Count = ? | |
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY = ALL | REGION = NY | CITY = ALL | |
| Measures | Impression Count = ? | Click Count = ? | Conv Count = ? | |
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY = ALL | REGION = TX | CITY = ALL | |
| Measures | Impression Count = 7 | Click Count = 7 | Conv Count = ? | |
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY = ALL | REGION = WA | CITY = ALL | |
| Measures | Impression Count = ? | Click Count = ? | Conv Count = | |

</Index Scan>
</Xmla result generator>

Tree Transformation Rules

To achieve consolidation of 13 logical operators into 2 physical operators, the MDX Query Compiler uses the generic depth first visitor framework described above. For QUERY Q2, the transformation rules that are executed are LTR1, QTR1, QTR2 and UTR1. We describe the new rule, UTR1, below UTR1—UnionTransformation Rule #1

As we have noted in the earlier rule, LTR1, leaf nodes are converted to index scans. The UTR1 transformation rule states that two index scans can be merged into a single index scan using the merge method of the tuple API. The merge method of the API will be called only if the index scan tuple collections have a single dimension with different members. All other dimensions are set to the same level values.

In QUERY Q2, the UTR1 rule is initially applied to merge the index scans for [GEO].[All GEOs].[UNITED STATES]. [TX) and (GEO. All GEOs].[UNITED STATES].[WA]. The transformation engine processes bottom up and applies the UTR1 rule to merge the index scans with members {[GEO]. [All GEOs].[UNITED STATES].[TX], [GEO].[All GEOs]. [UNTIED STATES].[WA]} and the other index scan with member {[GEO].[All GEOs].[UNITED STATES].[NY]}. This generates the final index scan operator with members {[GEO].[All GEOs].[UNITED STATES].[TX], [GEO].[All GEOs].[UNITED STATES].[WA],[GEO].[All GEOs]. [UNITED STATES].[NY]}.

CrossJoin on Dimensions

Consider the following query.

QUERY Q3:
SELECT
{
[Measures]. [Impression Count]
,[Measures].[Interaction Count]
,[Measures].[Click Count]
,[Measures].Conversion Count]
}ON COLUMNS
,CrossJoin
(
{
 [GEO].[All GEOs].[UNITED STATES].[CA]
 ,[GEO].[All GEOs].[UNITED STATES].[NY]
 ,[GEO].[All GEOs].[UNITED STATES].[TX]}
 ,[GEO].[All GEOs].[UNITED STATES].[WA]}
}
{[TIME].[All TIMEs].[2008]}
) ON ROWS
FROM [Attribution]

Query Compiler

Tree Transformation

For QUERY Q3, the compiler generates a logical tree representation which consists of 1 CrossJoin Node apart from 1 Query Node, 2 Axis Nodes and 9 Leaf Nodes. The aim of the tree transformation algorithm is to generate a minimal set of Tuple requests to the access layer.

```
<Query>
  <Axis>
  <{ }>
    <Leaf>
      [Measures].[Impression Count]
    </Leaf>
    <Leaf>
      [Measures].[Interaction Count]
    </Leaf>
    <Leaf>
      [Measures].[Click Count]
    </Leaf>
    <Leaf>
      [Measures]. [Conversion Count]
    </Leaf>
  </{ }>
  </Axis>
  <Axis>
  <Crossjoin>
    <{ }>
      <Leaf>
        [GEO].[All GEOs].[UNITED STATES].[CA]
      </Leaf>
      <Leaf>
        [GEO].[All GEOs].[UNITED STATES].[NY]
      </Leaf>
      <Leaf>
        [GEO].[All GEOs].[UNITED STATES].[TX]
      </Leaf>
      <Leaf>
        [GEO].[All GEOs].[UNITED STATES].[WA]
      </Leaf>
    </{ }>
    <{ }>
      <Leaf>
        [TIME].[All TIMEs].[2008]
      </Leaf>
    </Crossjoin>
  </Axis>
  <Slicer>
    <Leaf>
      [PUBLISHER_ID].[All PUBLISHER_IDs].[HP]
    </Leaf>
  </Slicer>
</Query>
```

The minimal set generated by the compiler is two physical operators. The set contains 4 distinct tuples—each for a distinct value for the leaf members in the Union branches.

<Xmla result generator>
<Index_Scan                         isEagerScan=false eagerScanPossibleCandidate=false>

| Dimension | Level1 | Level2 | Level3 | Level4 |
|---|---|---|---|---|
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |

-continued

| Dimension | Level1 | Level2 | Level3 | Level4 |
|---|---|---|---|---|
| Geo | COUNTRY = ALL | REGION = CA | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = NY | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = TX | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = WA | CITY = ALL | |

</Index Scan>
</Xmla result generator>

Tree Transformation Rules

To achieve consolidation of 13 logical operators into 2 physical operators, the MDX Query Compiler uses the depth first visitor framework described above. For QUERY Q3, the transformation rules which are executed are LTR1, QTR1, QTR2, STR1, UTR1 and CJTR1. A new rule, CJTR1, is described below.

CJTR1—CrossJoinTransformation Rule #1

As we have noted in the earlier rule, LTR1, leaf nodes are converted to index scans. The CJTR1 transformation rule states that 2 index scans can be merged into a single index scan using the multiply method of the tuple API.

The most important part of this rule is that it distinguishes between logical operators that can be pushed to the access layer and the ones that cannot be pushed to the access layer. At the time of definition, every logical operator is assigned a property of SARGABLE or NON_SARGABLE. A logical operator declared SARGABLE can be pushed into the access layer. A NON_SARGABLE operator is not pushed into the access layer and it is not multiplied with other SARGABLE operators.

In QUERY Q3, the application of LTR1 and UTR1 results in a single index scan operator with the member set {[GEO].[All GEOs].[UNITED STATES].[CA], [GEO].[All GEOs].[UNITED STATES].[NY], [GEO].[All GEOs].[UNITED STATES].[TX], [GEO].[All GEOs].[UNITED STATES].[WA]}. Similarly, the application of LTR1 and UTR1 on the other side of CrossJoin results in a single index scan operator with the member set {[TIME].[All TIMEs].[2008]}. The multiplication of the two tuple sets from the index scan operators results in the final index scan operator shown in the plan above.

Children on Dimensions

Consider the following query.

QUERY Q4:
SELECT
{
[Measures].[Impression Count]
,[Measures].[Click Count]
,[Measures].[Conversion Count]
}ON COLUMNS
,[GEO].[All GEOs].Children ON ROWS
FROM [Attribution]

Query Compiler

Tree Transformation

For QUERY Q4, the compiler generates a logical tree representation which consists of a Children node apart from 1 Query Node, 2 Axis Nodes and 5 Leaf Nodes. Once again, the aim of the tree transformation algorithm is to generate a minimal set of Tuple requests to the access layer.

```
<Query>
  <Axis>
    <{ }>
      <Leaf>
        [Measures].[Impression Count]
      </Leaf>
      <Leaf>
        [Measures].[Click Count]
      </Leaf>
      <Leaf>
        [Measures].[Conversion Count]
      </Leaf>
    </{ }>
  </Axis>
  <Axis>
    <Children>
      <Leaf>
        [GEO].[All GEOs]
      </Leaf>
    </Children>
  </Axis>
  <Slicer>
    <Leaf>
      [PUBLISHER_ID].[All PUBLISHER_IDs].[HP]
    </Leaf>
  </Slicer>
</Query>
```

The minimal set generated by the compiler is two physical operators. The tuple generated for the index scan contains a specially marked value 'CHILDREN' for the dimension GEO's top level.

<Xmla result generator>
<Index_Scan                                isEagerScan=false
eagerScanPossibleCandidatc=false>

| Dimension | Level1 | Level2 | Level3 | Level4 |
|---|---|---|---|---|
| Advertiser | Advertiser_id = ALL | | | |
| AdId | AD_ID = ALL | | | |
| AdName | NAME = ALL | | | |
| Time | YEAR = ALL | MONTH = ALL | DAY = ALL | HOUR = ALL |
| Geo | COUNTRY <> ALL | REGION = ALL | CITY = ALL | |

</Index Scan>
</Xmla result generator>
Tree Transformation Rules

To achieve consolidation of 13 logical operators into 2 physical operators, the MDX Query Compiler uses the generic depth first visitor framework as described above. For QUERY Q4, the transformation rules which are executed are LTR1, QTR1, QTR2 and CTR1. We describe the new rule, CTR1, below CTR1—Children Transformation Rule #1

As we have noted in the earlier rule, LTR1, leaf nodes are converted to index scans. The CTR1 transformation rule states that a CHILDREN leaf operator can be merged into an index scan by setting the particular level on a specific dimension is marked with a special value '<>ALL'. The '<>ALL' is a specific flag which indicates to the access layer that a family (i.e., hierarchical) expansion is required on this level.

In QUERY Q4, the application of LTR1 results in a single index scan operator with the member set {[GEO].[All GEOs]}. The CTR1 rule is then applied to this index scan. The GEO dimension's top level is marked using the Children method in the tuple API.

CrossJoin, Union and Children on Multiple Dimensions
Query
SELECT
{
  [Measures].[Impression Count]
  ,[Measures].[Interaction Count]
  ,[Measures].[Click Count]
  ,[Measures].[Conversion Count]
}ON COLUMNS
,CrossJoin
(
  {
    [GEO].[All GEOs].[UNITED STATES].[CA]
    ,[GEO].[All GEOs].[UNITED STATES].[NY]
    ,[GEO].[All GEOs].[UNITED STATES].[TX]
    ,[GEO].[All GEOs].[UNITED STATES].[WA]
  }
  ,{
    [TIME].[All TIMEs].[2008]
    ,[TIME].[All TIMEs].[2008].[12]
  }
) ON ROWS
FROM [Attribution]

Query Compiler Interleaving of Transformation Rules

Applying all of the rules above, a single index scan request is generated for the multitude of leaf, union and cross join operators. This illustrates the ability to use the transformation framework to apply rules recursively to reduce arbitrarily complex query trees to simple access layer requests.

| | TupleScan Request | | | |
|---|---|---|---|---|
| Dimension | Level1 | Level2 | Level3 | Level4 |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = CA | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = NY | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = TX | CITY = ALL | |
| Advertiser | Advertiser_id = ALL | | | |
| AdId | AD_ID = ALL | | | |
| AdName | NAME = ALL | | | |
| Time | YEAR = 2008 | MONTH = ALL | DAY = ALL | HOUR = ALL |
| Geo | COUNTRY = ALL | REGION = WA | CITY = ALL | |
| Advertiser | Advertiser_id = ALL | | | |
| AdId | AD_ID = ALL | | | |
| AdName | NAME = ALL | | | |
| Time | YEAR = 2008 | MONTH = 12 | DAY = ALL | HOUR = ALL |
| Geo | COUNTRY = ALL | REGION = CA | CITY = ALL | |
| Advertiser | Advertiser_id = ALL | | | |

-continued

| | | TupleScan Request | | |
|---|---|---|---|---|
| Dimension | Level1 | Level2 | Level3 | Level4 |
| AdId | AD_ID = ALL | | | |
| AdName | NAME = ALL | | | |
| Time | YEAR = 2008 | MONTH = 12 | DAY = ALL | HOUR = ALL |
| Geo | COUNTRY = ALL | REGION = NY | CITY = ALL | |
| Advertiser | Advertiser_id = ALL | | | |
| AdId | AD_ID = ALL | | | |
| AdName | NAME = ALL | | | |
| Time | YEAR = 2008 | MONTH = 12 | DAY = ALL | HOUR = ALL |
| Geo | COUNTRY = ALL | REGION = TX | CITY = ALL | |
| Advertiser | Advertiser_id = ALL | | | |
| AdId | AD_ID = ALL | | | |
| AdName | NAME = ALL | | | |
| Time | YEAR = 2008 | MONTH = 12 | DAY = ALL | HOUR = ALL |
| Geo | COUNTRY = ALL | REGION = WA | CITY = ALL | |

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
receive a request for data from a multi-dimensional cube divided into a plurality of partitions distributed across a plurality of nodes supporting a shared nothing distributed multi-dimensional database;
transform the request into physical access layer operators in a tree structure; and
reduce the tree structure into a first index scan operator at least in part by applying a set of transformation rules to the tree structure, wherein the set of transformation rules comprises a leaf transformation rule, wherein the leaf transformation rule provides for transformation of at least one leaf node into a second scan index operator, and a query transformation rule, wherein the query transformation rule provides for transformation of at least one axis node and at least the second scan index operator into the first scan index operator.

2. The computer readable storage medium of claim 1 further comprising executable instructions to reduce the tree structure into a result creation operator.

3. The computer readable storage medium of claim 1 further comprising executable instructions to merge index scan components when the index scan components have a single dimension with different members.

4. The computer readable storage medium of claim 1 further comprising executable instructions to transform a cross-join operator to an access layer index scan operator.

5. The computer readable storage medium of claim 4 further comprising executable instructions to distinguish operators that are pushable to an access layer.

6. The computer readable storage medium of claim 1 further comprising executable instructions to transform a union query operator's hierarchical children to an access layer index scan operator.

7. The computer readable storage medium of claim 1 further comprising executable instructions to transform a hierarchical child operator to an access layer index scan operator.

8. The computer readable storage medium of claim 1 further comprising executable instructions to establish a slicer axis tuple created by leaf nodes under slicer nodes created by another axis.

9. The computer readable storage medium of claim 1 further comprising executable instructions to apply the set of transformation rules to the tree structure by depth first traversal of the tree structure.

10. The computer readable storage medium of claim 1 further comprising executable instructions for bottom traversal to replace entire sub-trees with intermediate physical access operators to facilitate recursive application of the set of transformation rules to the tree structure.

11. The computer readable storage medium of claim 1, further comprising executable instructions to:
define a first logical operator at least in part by,
determining whether the first logical operator is adapted to be pushed to the physical access layer,
in response to determining that the first logical operator is adapted to be pushed to the physical access layer, assigning the first logical operator a property of SARGABLE, and
in response to determining that the first logical operator is not adapted to be pushed to the physical access layer, assigning the first logical operator a property of NON_SARGABLE.

12. The computer readable storage medium of claim 1 wherein the data of the multi-dimensional cube comprises non-aggregated and aggregated tuples, each tuple having multiple dimensions, each dimension having one or more dimension levels with some of the dimension levels designated as aggregation levels, each dimension level having values, one of the values of each dimension level being an aggregation value, and each tuple is stored in a partition based on the values of the aggregation levels of the tuple.

13. A computing system, having a memory, comprising:
a component configured to store a plurality of transformation rules, wherein the stored plurality of transformation rules comprise at least one slicer transformation rule, at least one children transformation rule, and at least one crossjointransformation rule;
a component configured to receive a request for data from a multi-dimensional cube divided into a plurality of partitions distributed across a plurality of nodes supporting a shared nothing distributed multi-dimensional database;
a component configured to transform the request into physical access layer operators in a tree structure; and
a component configured to reduce the tree structure into an index scan operator of a physical plan based on a set of transformation rules wherein the reducing is based at least in part on the at least one slicer transformation rule, the at least one children transformation rule, and the at least one crossjointransformation rule; and
wherein at least one of the components comprises computer-executable instructions stored in the memory for execution by the computing system.

14. The computing system of claim 13 wherein the physical plan comprises an index scan operator.

15. The computing system of claim 14 wherein the physical plan comprises a result creation operator.

16. A method, performed by a computing system having a processor, the method comprising:
storing a plurality of transformation rules, wherein the stored plurality of transformation rules comprise at least one leaf transformation rule, at least one query transformation rule, and at least one uniontransformation rule;
receiving a request for data from a multi-dimensional cube divided into a plurality of partitions distributed across a plurality of nodes supporting a shared nothing distributed multi-dimensional database;
transforming the request into physical access layer operators in a tree structure; and
reducing the tree structure into an index scan operator based on a set of transformation rules wherein the reducing is based at least in part on the at least one leaf transformation rule, the at least one query transformation rule, and the at least one uniontransformation rule.

17. The method of claim 16, further comprising:
determining whether a first operator is a blocking operator.

18. The method of claim 17, further comprising:
in response to determining that the first operator is not a blocking operator, merging a first axis node into the first operator.

19. The method of claim 16, further comprising:
setting a level of a dimension of the request to children.

* * * * *